United States Patent
Cavins et al.

(10) Patent No.: US 9,669,588 B2
(45) Date of Patent: Jun. 6, 2017

(54) DEVICES AND METHODS FOR STARTING STRIP MATERIAL IN A SUBSTRATE PROCESSING MACHINE

(71) Applicant: H.B. FULLER COMPANY, St. Paul, MN (US)

(72) Inventors: Orion A. Cavins, Vancouver, WA (US); Martin E. Koeltzow, Roggen, CO (US)

(73) Assignee: H.B. Fuller Company, St. Paul, MN (US)

( * ) Notice: Subject to any disclaimer, the term of this patent is extended or adjusted under 35 U.S.C. 154(b) by 189 days.

(21) Appl. No.: 14/477,045

(22) Filed: Sep. 4, 2014

(65) Prior Publication Data

US 2016/0067914 A1    Mar. 10, 2016

(51) Int. Cl.
*B29C 65/00*    (2006.01)
*B29C 70/38*    (2006.01)
*B31F 1/28*    (2006.01)

(52) U.S. Cl.
CPC ............ *B29C 70/38* (2013.01); *B31F 1/2822* (2013.01); *B31B 2201/9038* (2013.01); *B31B 2201/9052* (2013.01)

(58) Field of Classification Search
CPC ..... B29C 65/002; B29C 66/472; B65H 20/14; B65H 51/16; B65H 2301/4461; B65H 2301/522; B65H 2406/122; B65H 2701/1762; B65H 2301/446; B65H 2406/12; B65H 20/10
See application file for complete search history.

(56) References Cited

U.S. PATENT DOCUMENTS 2,052,869 A    9/1936    Coanda
2,596,625 A    5/1952    Vergobbi
(Continued)

FOREIGN PATENT DOCUMENTS

GB    1 509 506    5/1978
JP    2521548 B    8/1996
(Continued)

OTHER PUBLICATIONS

"Impulse momentum principle" ( https://www.youtube.com/watch?v=IWHIqP17QU4) (Publication date May 24, 2012).*

*Primary Examiner* — Jacob T Minskey
*Assistant Examiner* — Vishal I Patel

(57) ABSTRACT

Systems and methods are disclosed for starting a strip material in a substrate processing machine wherein the machine is not stopped and operators do not have to reach into the running machine to start the strip material. Exemplary systems include a strip material guide apparatus including at least one guide arm and at least one gas stream generator configured to direct strip material from the guide arm into a nip point of a substrate processing machine to join the strip material with the running substrates. The gas stream generator is operable to cause a leading end of a strip material dispensed from the guide arm to be conveyed via a gas stream toward the nip point or toward the running substrates, such that the leading end of the strip material becomes engaged by the substrate processing machine at the nip point and the strip material joins with the running substrates.

11 Claims, 27 Drawing Sheets

(56) References Cited

U.S. PATENT DOCUMENTS

| | | | |
|---|---|---|---|
| 2,678,173 A | 5/1954 | Phelps | |
| 2,713,510 A | 7/1955 | Coanda | |
| 3,047,208 A | 7/1962 | Coanda | |
| 3,795,367 A | 3/1974 | Mocarski | |
| 3,795,371 A | 3/1974 | Hobart et al. | |
| 3,801,020 A | 4/1974 | Mocarski | |
| 3,806,039 A | 4/1974 | Mocarski | |
| 3,993,301 A | 11/1976 | Vits | |
| 4,046,492 A | 9/1977 | Inglis | |
| 4,147,287 A | 4/1979 | Reba | |
| 4,452,837 A | 6/1984 | Clausen et al. | |
| 4,481,054 A | 11/1984 | Clausen et al. | |
| 4,676,445 A * | 6/1987 | Itikawa | G03D 13/003 226/7 |
| 4,923,567 A | 5/1990 | Liedes et al. | |
| 5,203,485 A | 4/1993 | Cahill et al. | |
| 5,203,509 A | 4/1993 | Bieg | |
| 5,329,962 A | 7/1994 | Ohnishi et al. | |
| 5,402,938 A | 4/1995 | Sweeney | |
| 5,490,300 A | 2/1996 | Horn | |
| 5,759,339 A * | 6/1998 | Hartman | B23Q 1/28 156/177 |
| 6,705,500 B2 | 3/2004 | Shea et al. | |
| 6,863,060 B2 | 3/2005 | Martinez | |
| 7,222,653 B2 | 5/2007 | Robiitaille et al. | |
| 7,255,255 B2 | 8/2007 | Shea et al. | |
| 7,921,892 B2 | 4/2011 | Baierl et al. | |
| 8,640,982 B2 | 2/2014 | Nash et al. | |
| 8,690,148 B1 | 4/2014 | Smith et al. | |
| 2003/0047641 A1 | 3/2003 | Kinnunen et al. | |
| 2003/0049380 A1 | 3/2003 | Kinnunen et al. | |
| 2013/0068874 A1 | 3/2013 | Schwamberger et al. | |

FOREIGN PATENT DOCUMENTS

| | | |
|---|---|---|
| WO | WO 02/083530 | 10/2002 |
| WO | WO2012164158 | 12/2012 |

* cited by examiner

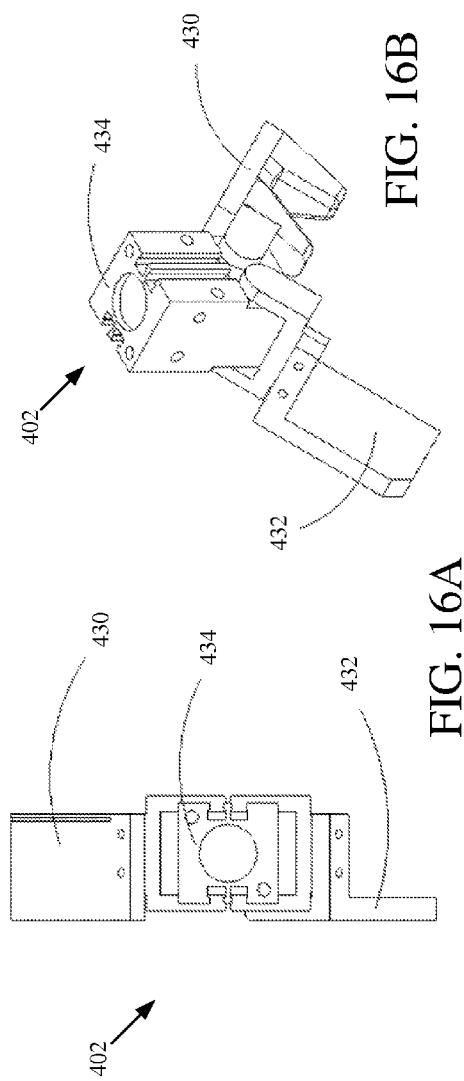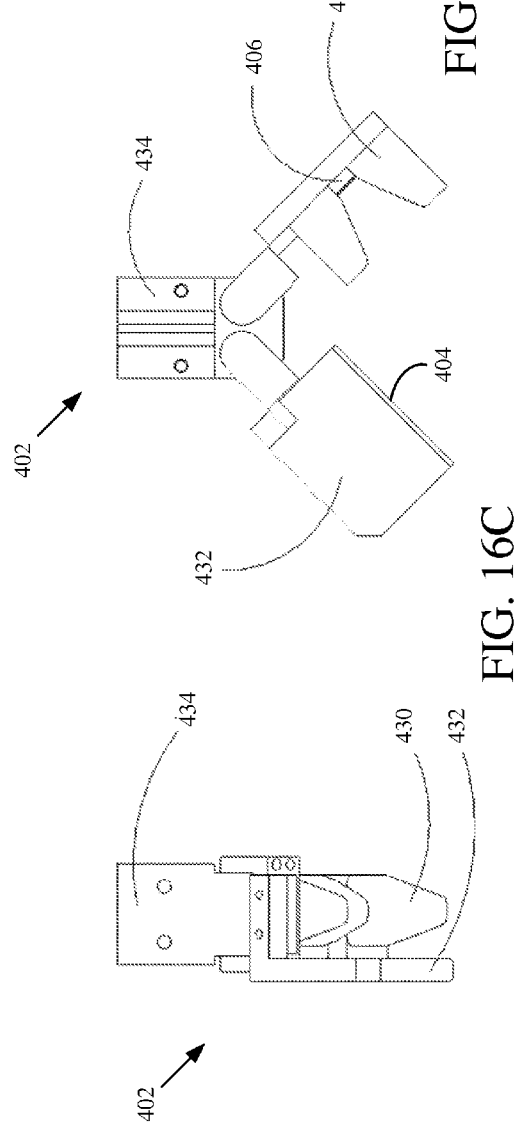
FIG. 16A
FIG. 16B
FIG. 16C
FIG. 16D

DEVICES AND METHODS FOR STARTING STRIP MATERIAL IN A SUBSTRATE PROCESSING MACHINE

FIELD

The present disclosure concerns systems and methods for starting strip material in a substrate processing machine, such as a corrugating machine.

BACKGROUND

Applying strip materials between liner and median in a corrugating process is known in the art, as shown in U.S. Pat. No. 4,452,837. Strip materials include various liner reinforcements and opening tapes that are also known in the art. Exemplary reinforcements and opening tapes are marketed under the trade names String King®, Sesame®, Open Sesame®, and Cutting Edge®.

These strip materials are commonly applied between the substrates using systems similar to those shown in U.S. Pat. Nos. 7,255,255 and 8,640,982, which are incorporated herein by reference. Exemplary strip material guide systems are marketed under the trade names Intellibeam® and Quik Adjust Beam®.

However, known systems have shortcomings when starting strip materials for a production run. Conventional methods for starting strip material require that the processing machine be stopped while the strip material is manually attached to the substrate, or require the strip material be tossed into a nip point by an operator while the machine is running. Stopping the machine to start the strip material results in downtime and board waste. Not stopping the machine has the safety risk inherent in having an operator's hand and limb near a running substrate or nip point while tossing the strip material into the machine.

Accordingly, there is a need for systems and methods for starting a strip material in a substrate processing machine that can be accomplished without stopping the machine and without having an operator reach into the machine to start the tapes.

SUMMARY

Disclosed systems and methods can fulfill the needs described above and/or other needs by providing a process for starting a strip material in a substrate processing machine wherein the machine is not stopped and operators do not have to reach into the running machine to start the strip material.

Exemplary systems disclosed herein include a strip material guide apparatus including at least one guide arm and at least one gas stream generator configured to direct strip material from the guide arm into a nip point of a substrate processing machine to join the strip material with one or more running substrates. The gas stream generator is operable to cause a leading end of a strip material dispensed from the guide arm to be conveyed via a gas stream toward the nip point or toward the running substrates, such that the leading end of the strip material becomes engaged by the substrate processing machine at the nip point and the strip material joins with the one or more running substrates.

In some embodiments, a device can be included in front of the gas stream generator that is capable of pinching and cutting the strip material. The device can cut the strip material to create a tail end of a first portion of the strip material that runs into the nip point and at the same time creating a lead end of a second portion of the strip material that remains in the strip material guide apparatus. The device can also pinch the lead end of the second portion of the strip material to hold it until it is ready to be started into the nip point to begin another run.

The gas stream generators described herein can create a gas stream that flows toward the nip point and utilizes fluid dynamics to entrain a free leading end of a strip material into the gas stream such that the leading end of the strip material is guided in the gas stream toward the nip point. In some embodiments, the strip material is dispensed through a passage in the gas stream generator, the same passage through which the gas stream flows. In other embodiments, the strip material can be positioned alongside of and/or in front of the gas stream generator and become drawn into the gas steam downstream from the gas steam generator.

Prior to using a gas stream generator to start a strip material, slack can be provided in the leading end portion of the strip material such that there is minimal resistance to the leading end portion of the strip material being entrained into and conveyed forward by the gas stream. A slacked portion of the strip material can be loaded into a passage in the gas stream generator in some embodiments, while in other embodiments a slacked portion of the strip material can be allowed to hang limp from an outlet of the gas stream generator prior to generating the gas stream. Once the leading end portion of the strip material is conveyed into the nip point and is engaged by the substrate processing machine, the gas stream generator can be turned off and the machine can continue to pull the strip material through the strip material guide apparatus into the machine.

In various embodiments, the strip material guide apparatus can include two or more beams, each having one or more of the disclosed guide arms and gas stream generators, with the two or more beams being located on opposite sides of one or more of the running substrates. This allows strip material to be dispensed onto different surfaces of the substrates, including between the substrates and on the outer sides of one or more of the substrates. The individual guide arms and gas stream generators can form assemblies that are adjustable transversely of the running substrates. Each of the assemblies can be coupled to a gas source via hoses or other conduits that are routed along the beam and arranged to move with the assemblies without kinking or becoming tangled.

The foregoing and other objects, features, and advantages of the disclosed technology will become more apparent from the following detailed description, which proceeds with reference to the accompanying figures.

BRIEF DESCRIPTION OF THE DRAWINGS

FIG. 16A-16D are various views of an exemplary strip pincher in an open position.

DETAILED DESCRIPTION

Figure 1:
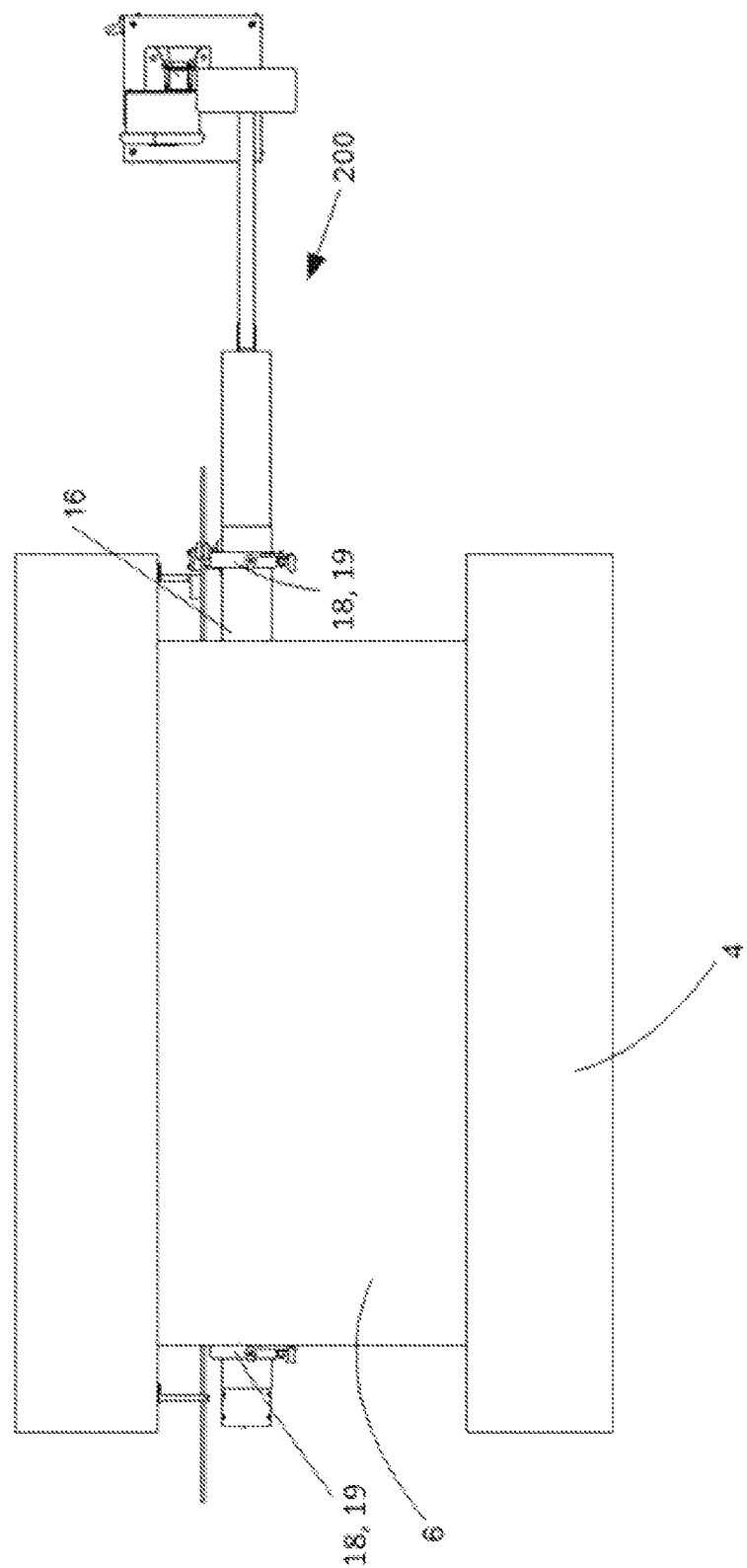
FIG. 1 is a top view of a portion of a substrate processing machine and an exemplary system for guiding strip material into the substrate processing machine.

The present disclosure concerns apparatuses, systems, and methods for starting strip material in a substrate processing machine. The following description is exemplary in nature and is not intended to limit the scope, applicability, or configuration of the invention in any way. The various embodiments are described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

As used herein, the term "strip material" means any elongated, thin, flexible material. For example, the term "strip material" can include a reinforcing tape, a tear tape, an adhesive tape (e.g., a hot melt tape), a ribbon, a strip, a band, a string, a wire, and the like.

As used herein, the term "substrate processing machine" means any machine operable to process one or more substrates, including any machine operable to join two or more substrates together to form a composite sheet of material. The term "substrate processing machine" expressly includes, but is not limited to, printing machines, die cutting machines, carton presses, fiber reinforcement application machines, folding machines, gluing machines, laminating machines, and corrugation machines, including a wet end and/or a dry end of a corrugation machine, or other similar machines.

As used herein, the term "substrate" means any sheet-like material, including films, webs, liners, medians, paper board, carton board, box board, corrugated board, or other sheet material or web material.

As used herein, the term "nip point" means a portion of a substrate processing machine where one or more substrates and one or more strip materials are joined together. Typically, a nip point includes one or more rollers (sometimes called "nip rolls"), between which the one or more substrates and the one or more strip materials pass, wherein the rollers cause the substrates and strip materials to become joined together into a single composite substrate.

As used herein, the term "Coanda effect" means the tendency of a fluid jet, such as a gas stream, to be attracted to a nearby surface, and the tendency of an object, such as a free portion of a strip material, to be attracted to a fluid jet. The Coanda effect is a result of entrainment of ambient fluid around the fluid jet. When a nearby surface does not allow the surrounding fluid to be pulled inwards towards the jet (i.e., to be entrained), the jet moves towards the surface instead. The fluid of the jet and the surrounding fluid are typically the same or similar substances (e.g., a gas stream into a body of ambient gas or a liquid stream into a body of liquid).

As used herein, the term "impulse principle" means the tendency of a relatively small volume, high pressure flow of gas to impact and entrain a much larger volume of ambient surrounding gas by creating a low pressure region around the high pressure stream.

As used herein, the terms "high pressure," "pressurized," and "compressed" refer to any gas pressure that is above the ambient air pressure, unless otherwise described.

Figure 2:
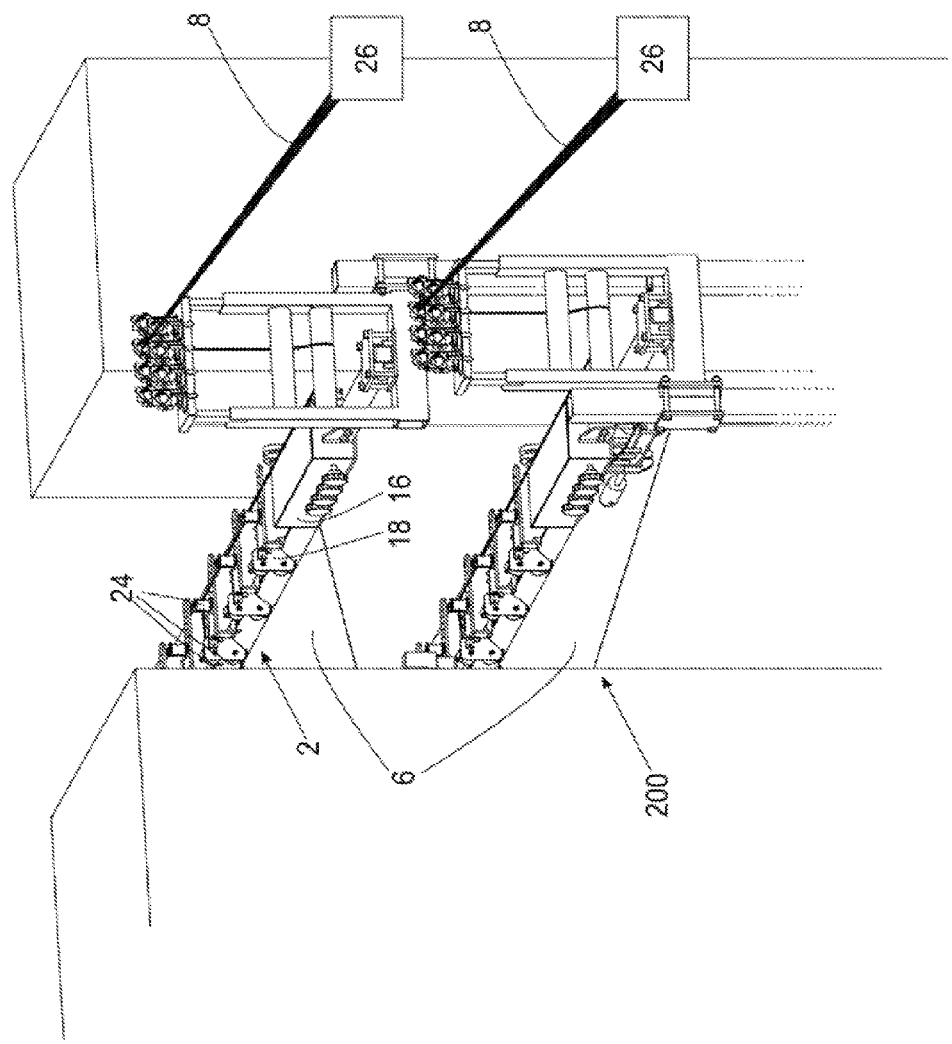
FIGS. 2 and 3 shows an exemplary dual beam system for guiding strip materials into a substrate processing machine from opposite sides of a running substrate.
Figure 3:
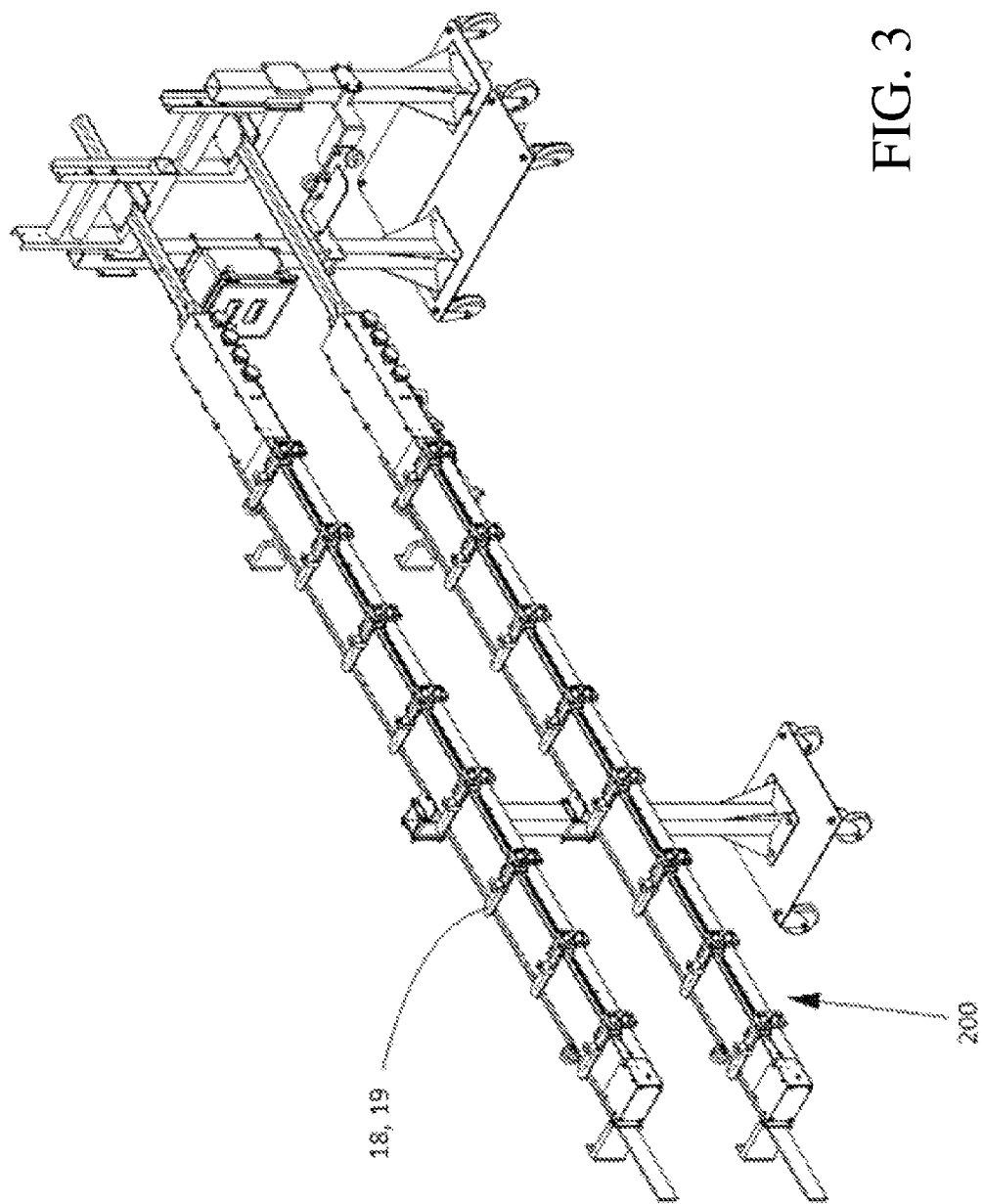

FIGS. 1-3 illustrate an exemplary strip material guide apparatus 200 installed in a substrate processing machine 4, as is disclosed in more detail in U.S. Pat. No. 8,640,982. The strip material guide apparatus 200 includes two elongated frames 16, one above the other. Each frame 16 supports one or more guide arms 18 that can be mounted in series along the length of the frame 16 for dispensing strip materials 8 into the machine 4 to be combined with running substrates 6.

Figure 4:
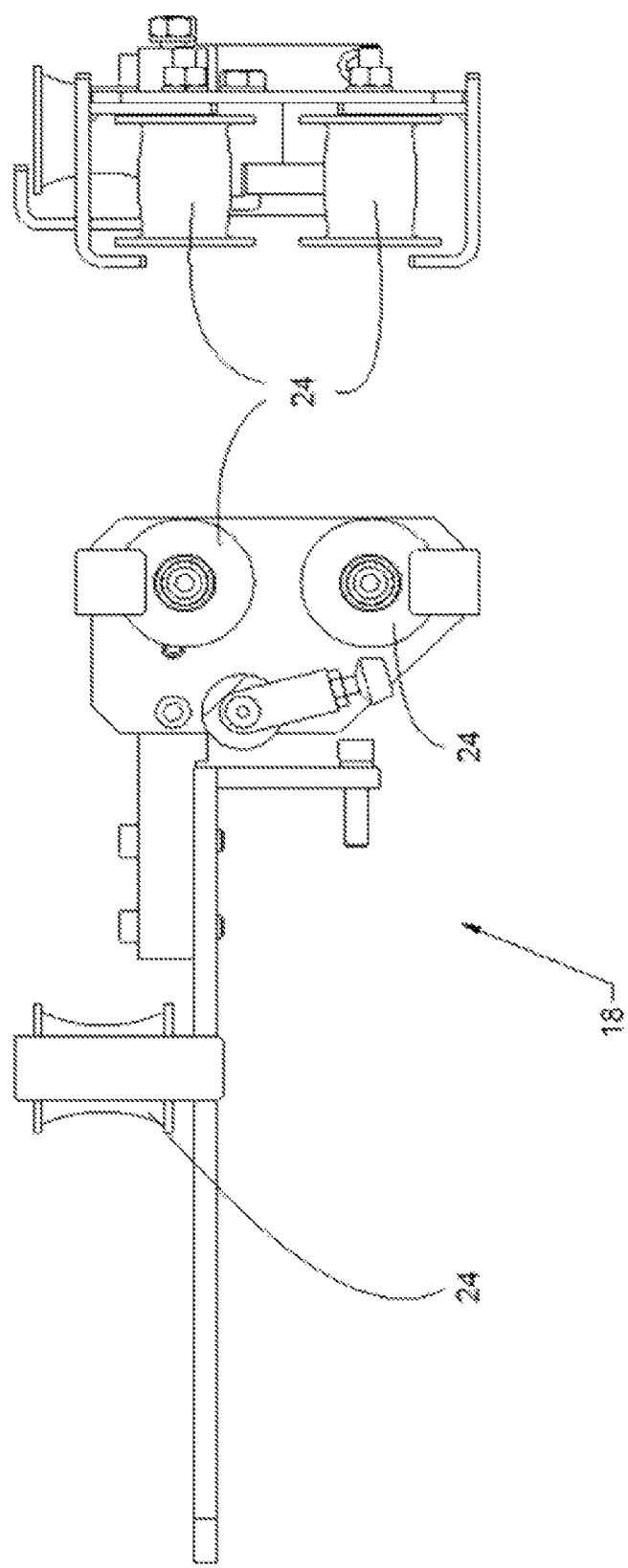
FIG. 4 shows side and front orthogonal views of an exemplary guide arm of the system of FIGS. 2 and 3.

FIG. 4 shows side and front orthogonal views of an exemplary guide arm 18 of the strip material guide apparatus 200 of FIGS. 1-3. As shown in FIG. 4, the guide arms 18 include pulleys 24 for receiving strip materials 8 that can be fed transversely of the substrates 6 from a remote supply 26 (FIG. 2) and then dispensed onto the substrates 6 for attachment and lamination thereto.

Figure 5C:
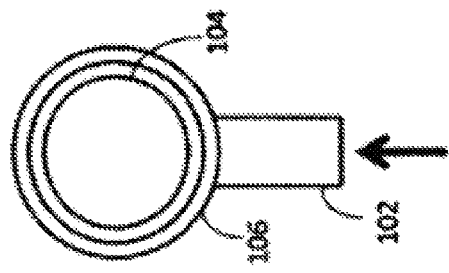
FIG. 5C is an end view of the gas stream generator of FIG. 5A.
Figure 5A:
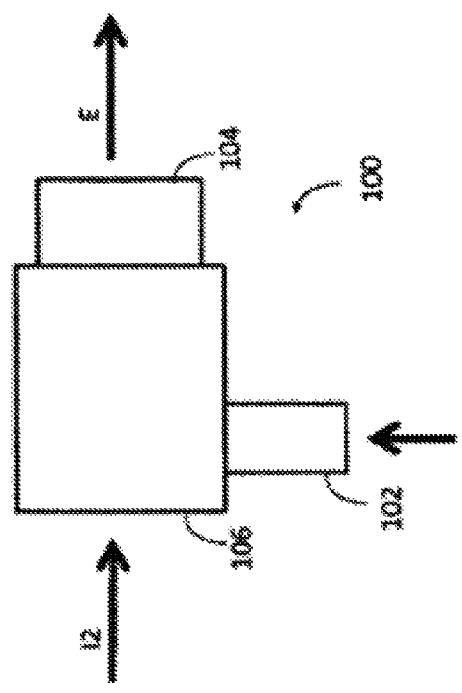
FIG. 5A is a side view of an exemplary gas stream generator.
Figure 5B:
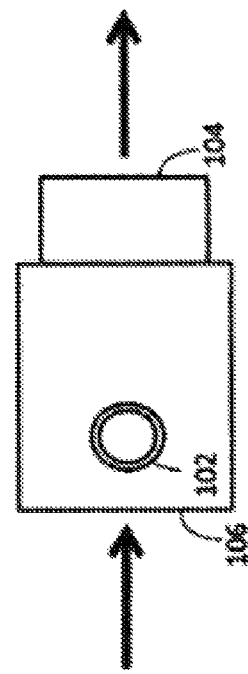
FIG. 5B is another side view of the gas stream generator of FIG. 5A orthogonal to the view of FIG. 5A.

FIG. 5 illustrates three orthogonal views of an exemplary gas stream generator 100 that can be used in certain embodiments disclosed herein. Gas stream generators disclosed herein can rely on a high pressure, low volume gas flow, such as that produced by a gas compressor, and the aerodynamic properties of its structure to generate a high volume, high velocity gas exhaust, and a high volume, low pressure (i.e., mild vacuum below 1 atm pressure) intake. For example, high pressure gas flows into an intake 102 and a high volume, high velocity gas exhaust E flows out of outlet 104. Ambient air 12 is drawn into inlet 106 due to a low pressure (e.g., less than 1 atm) generated at the inlet 106. In preferred embodiments, the intake 102, the inlet 106, and the outlet 104 have a circular cross section. Other shapes may also be used. The passage within device 100 between the inlet 106 and the outlet 104 may also have a circular cross section that varies in area along the longitudinal axis, such as becoming narrower toward the outlet 104.

Figure 6:
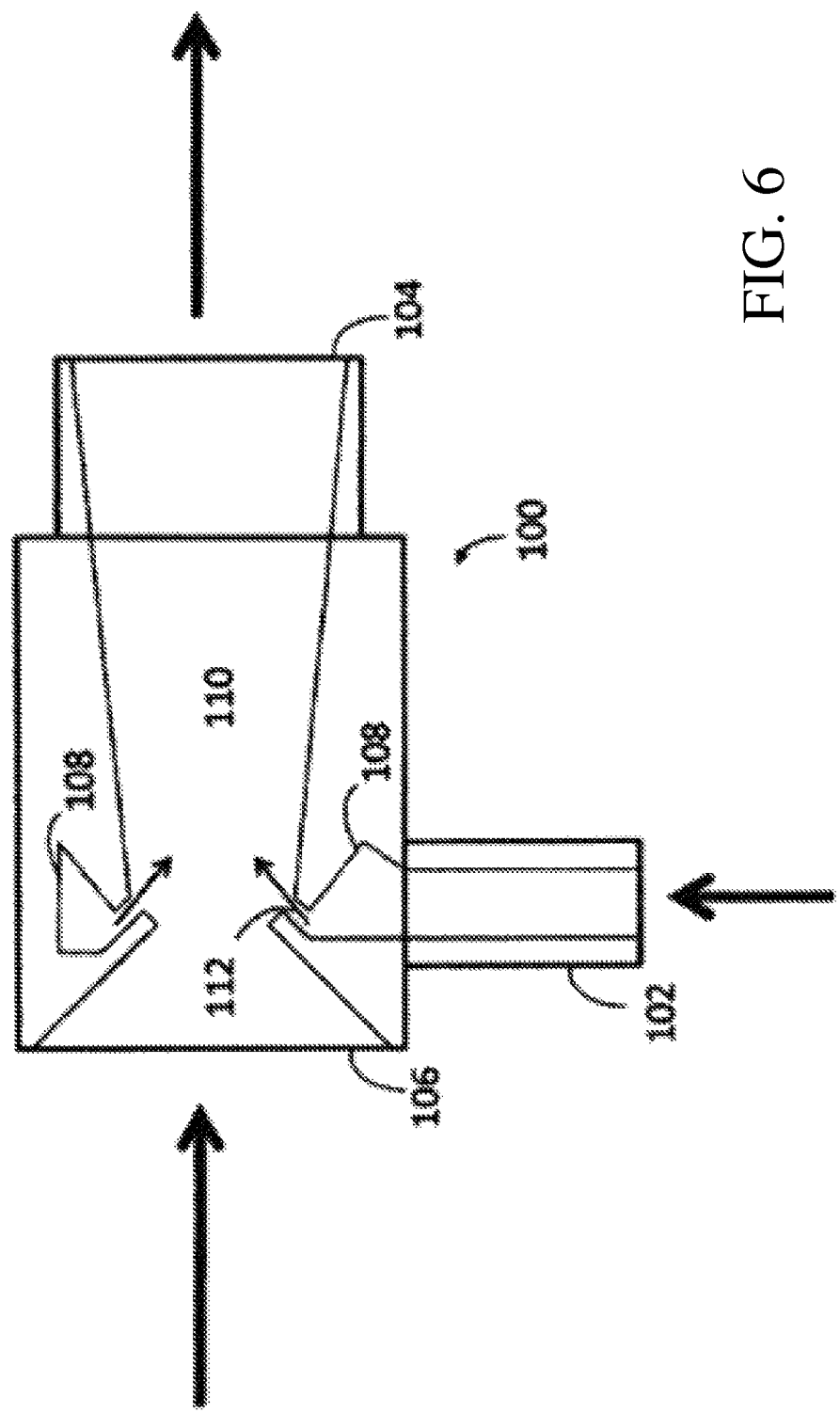
FIG. 6 is a cross-sectional view of the gas stream generator of FIG. 5A, according to a first embodiment.
Figure 7:
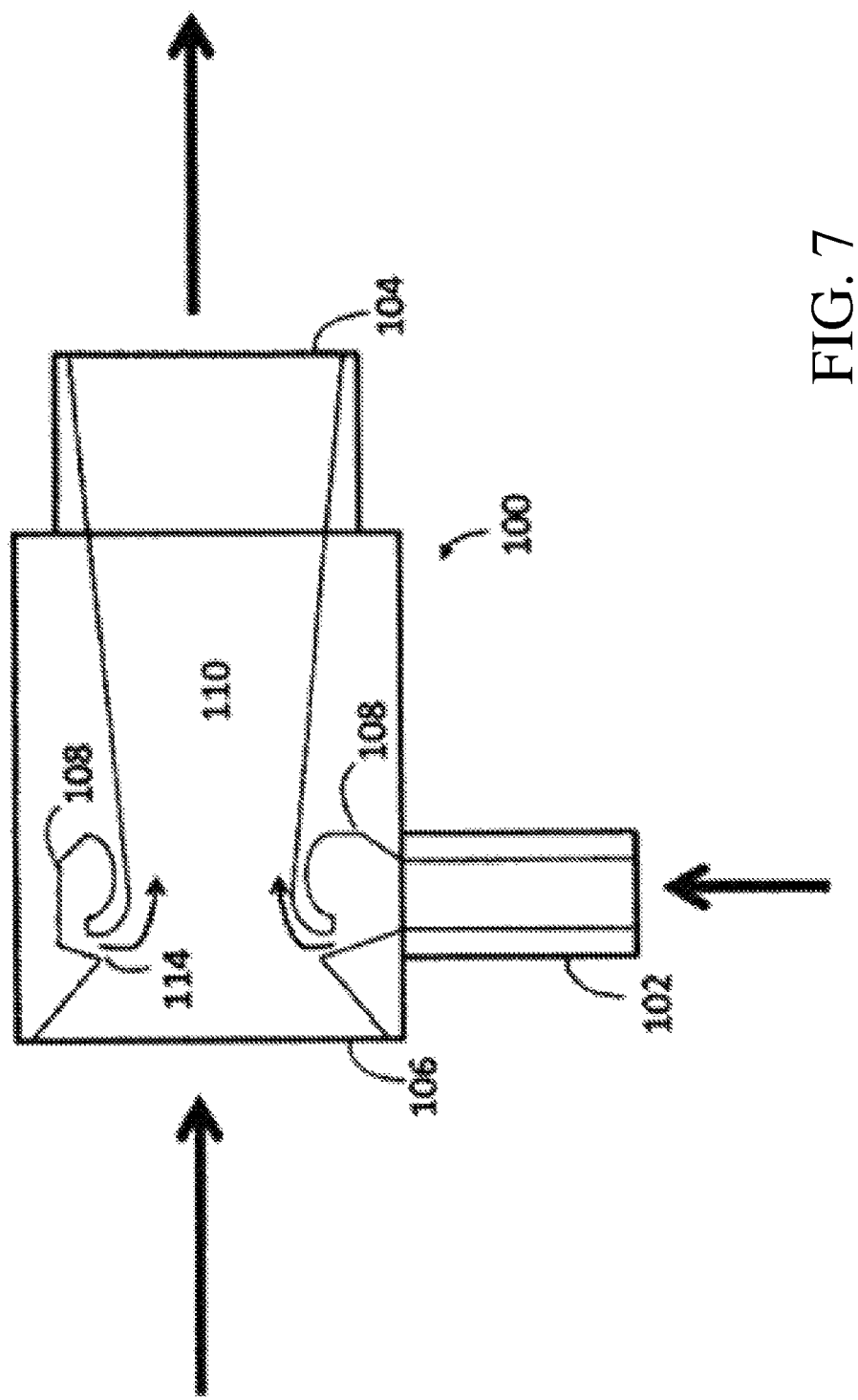
FIG. 7 is a cross-sectional view of the gas stream generator of FIG. 5A, according to a second embodiment.

FIGS. 6 and 7 illustrate two variation of the gas stream generator 100 shown in FIG. 5. Some gas stream generators rely on the impulse principle. FIG. 6 illustrates a cross section of a gas stream generator that relies on this principle. High pressure gas may flow into the gas stream generator 100 through intake 102 and into an internal ring chamber 108 encircling the gas stream generator's main chamber 110. The high pressure gas may enter the main chamber 110 through a small annular nozzle 112. Annular nozzle 112 may be shaped to accelerate and direct the high pressure flow towards the outlet 104. Under the impulse principle, a relatively small flow of high pressure gas may impact and entrain a large mass of ambient air. The high pressure flow from the annular nozzle 112 may create an area of lower pressure in the center (e.g., middle of chamber 110) which may induce a large volume of ambient air to flow into inlet 106 (e.g., the vacuum/sub-atmospheric pressure generated at inlet 106). The gases from intake 102 and inlet 106 may combine to create a high volume and high velocity flow out of outlet 104. Chamber 110 may be shaped as a converging, diverging, or a combination of converging and diverging nozzles to accelerate gas flow.

Some gas stream generators may rely on the Coanda effect, with or without also relying on the impulse principle. With the Coanda effect, a high velocity flow tends to attach to a surface and follow the surface's shape. Gas stream generators can take advantage of this by, for example, curving the surface of the nozzle leading to inside the main chamber. FIG. 7 illustrates a cross section of an embodiment of gas stream generator 100 that relies on the Coanda effect. Similar to the embodiment shown in FIG. 6, high pressure gas flows through first intake 102 and enters ring chamber 108. The high pressure gas flows through an annular nozzle 114 into the main chamber 110. The nozzle 114 may be shaped to accelerate the gas. The nozzle 114 may also be curved so that the entering flow will follow the curved surface. This curved surface guides the flow into and through main chamber 110. As with the embodiment in FIG. 6, the high pressure flow may create an area of lower pressure in the center (e.g., in chamber 110), which induces a large volume of ambient air to flow into inlet 106. The gas from intake 102 and inlet 106 may combine to create a high volume and high velocity flow out of outlet 104. Chamber 110 may be shaped to accelerate this flow.

Although some gas stream generator embodiments may include a moving adjustable nozzle, such as a moving adjustable variation of the nozzle 112 in FIG. 6 or the nozzle 114 in FIG. 7, moving parts are not necessary for a gas stream generator. Instead, gas stream generators may rely on fluid dynamics to create the exhaust flow.

Figure 8:
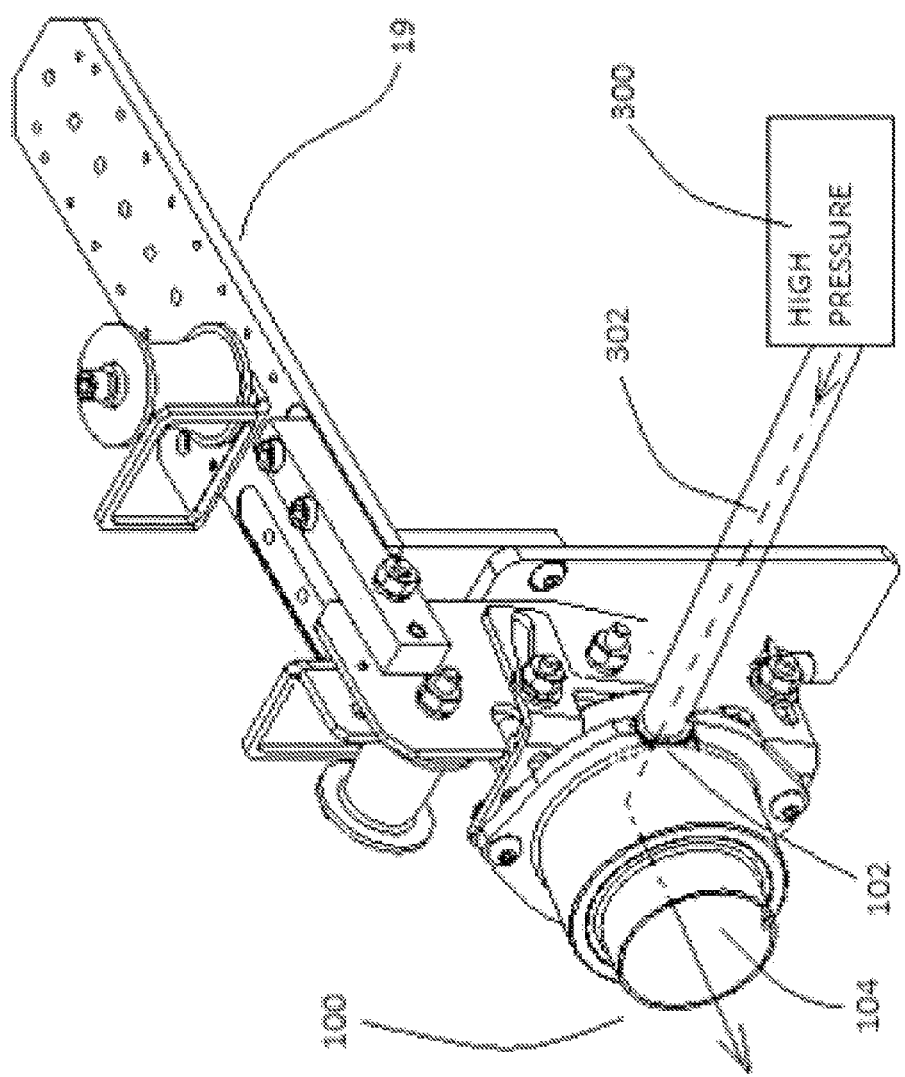
FIG. 8 shows an exemplary strip material guide arm including a gas stream generator.

FIG. 8 illustrates a guide arm assembly 19 that includes a gas stream generator 100 for causing strip material dispensed from the guide arm to be conveyed toward a nip point or running substrate by a resultant gas stream. The intake 102 of the gas stream generator 100 is connected with a source of a high pressure gas flow 300 (e.g., gas having a pressure above 1 atm). The source 300 may be located remotely and connected to assembly 19 by gas duct 302. Gas duct 302 may be any form or structure capable of transporting the high pressure gas flow a flexible hose or conduit or any length and shape). The source of the high pressure gas flow 300 may be a compressor, a blower, a tank of high pressure gas, or any other source of high pressure gas. Source 300 or duct 302 preferably includes a control mechanism, such as a valve, to control the flow of high pressure gas and thereby control the flow of gas in assembly 19. Throttling (e.g., reducing) the flow of high pressure gas will also throttle (e.g., reduce) gas flow in the gas stream generator 100 (i.e., gas entering inlet 106 and exhausted from outlet 104), which relies on the high pressure flow to induce a gas stream for conveying the strip material. Cutting off the high pressure flow completely will stop the gas flow into inlet 106 and exhaust through outlet 104.

Figure 9A:
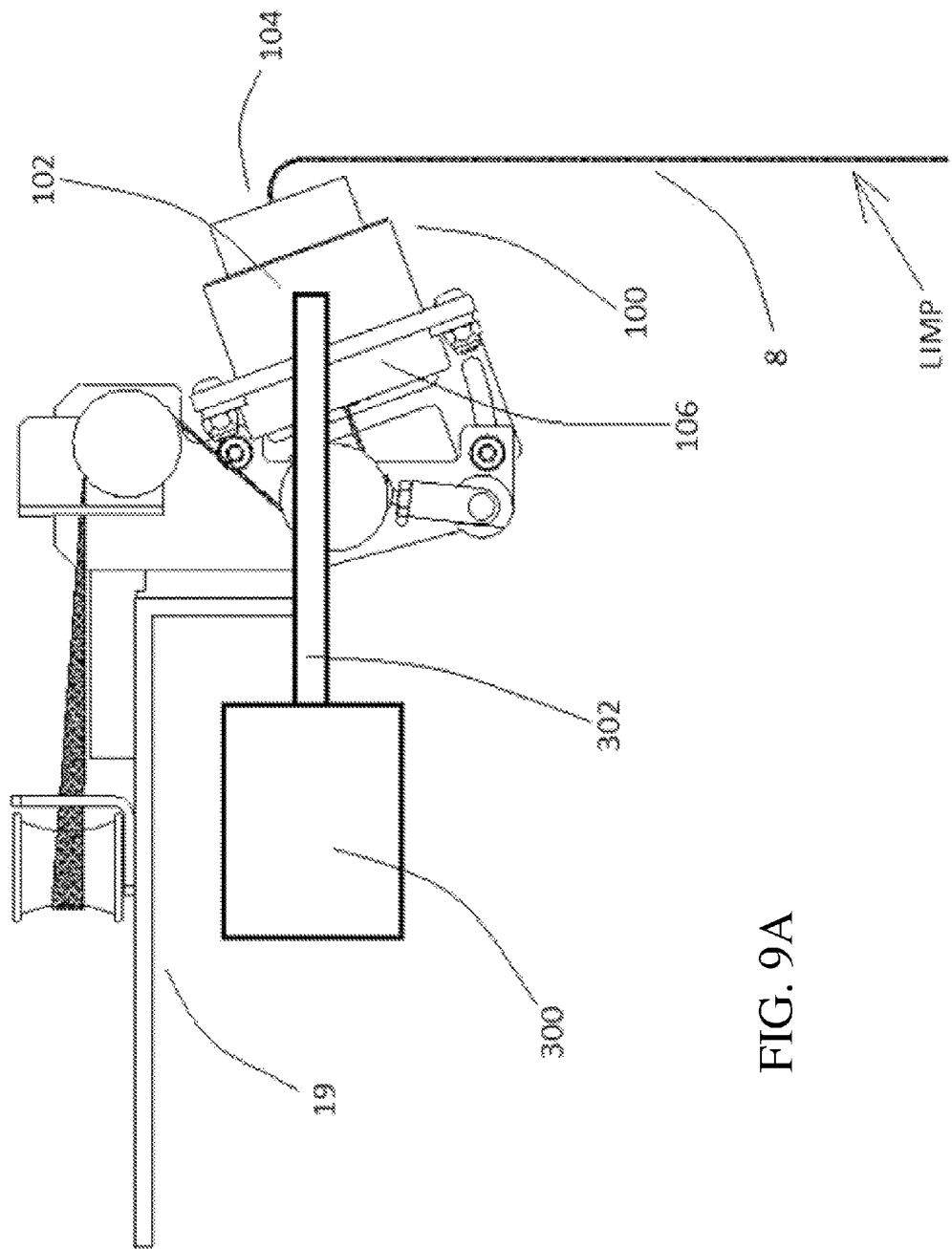
FIG. 9A is a side view of an exemplary strip material guide arm including a gas stream generator, with a strip material threaded through the guide arm and through the gas stream generator and having an end portion of the strip material hanging free from an outlet of the gas stream generator.

FIG. 9A is a side view of assembly 19 with gas source 300 and strip material 8 prior to starting the strip material into a substrate processing machine. Intake 102 may be connected to gas duct 302. Duct 302 may provide high pressure gas to gas stream generator 100 of assembly 19. The assembly 19 can be one of a plurality of similar assemblies 19 mounted along a strip material guide apparatus 200. In FIG. 9A, the strip material 8 is threaded through pulleys 24 of the guide arm, into inlet 106, and out through outlet 104, with a leading end portion hanging limp, ready to be started into the machine.

Figure 9B:
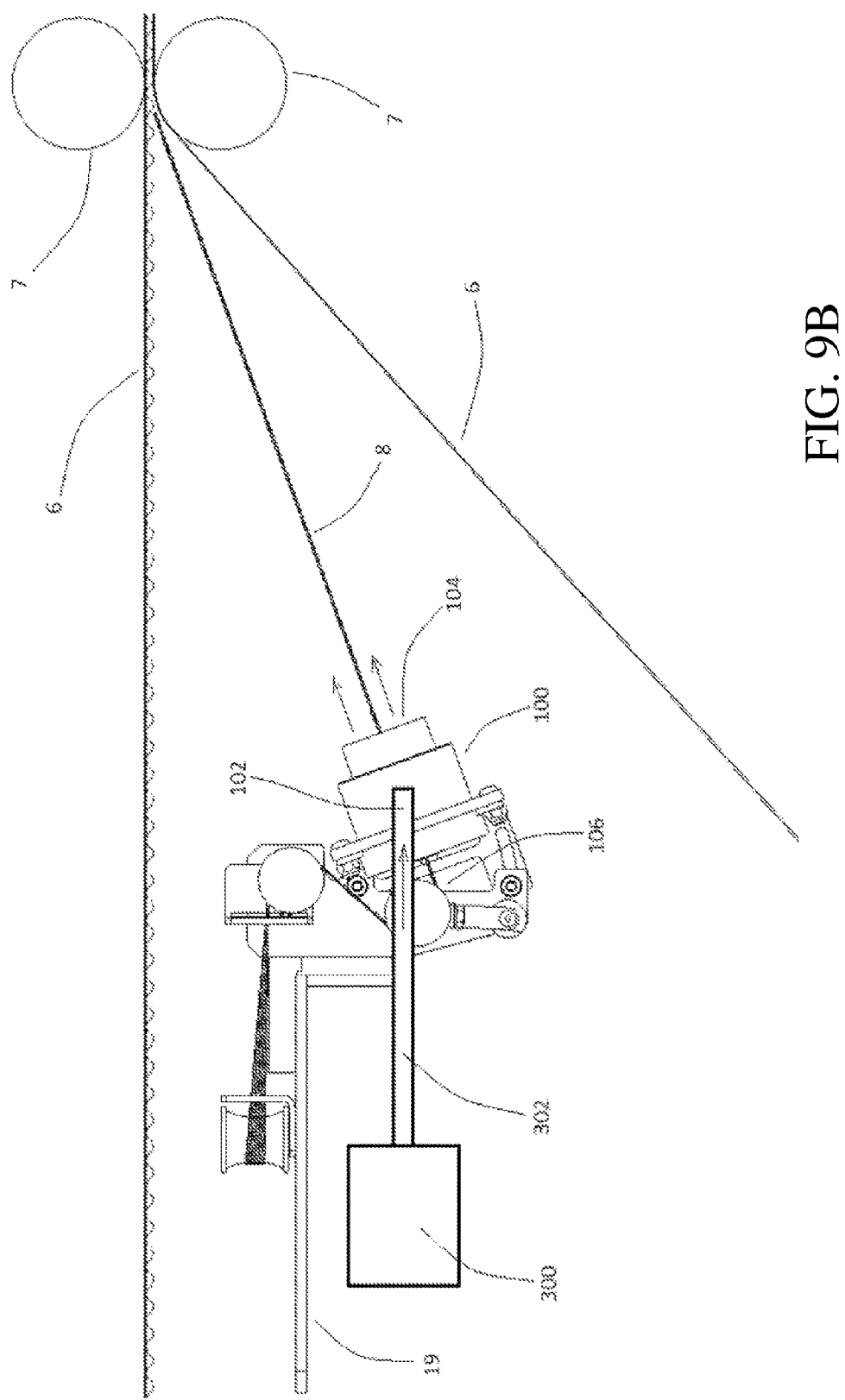
FIG. 9B shows the strip material guide arm including a gas stream generator of FIG. 9A in a substrate processing machine with the free hanging end portion of the strip material being directed to the nip point via an gas stream.

As illustrated in FIG. 9B, when gas is introduced through gas duct 302 to inlet 102, a gas stream is generated flowing in through inlet 106 and exiting through outlet 104, forcing the limp leading end portion of the strip material 8 to be conveyed toward and into the nip point between rollers 7 and substrates 6. The substrate processing machine 4 then pulls the strip material along with the running substrate to continue dispensing the strip material through the assembly 19. The gas stream generator 100 can be turned off after the strip material 8 is engaged in the machine 4.

Figure 10A:
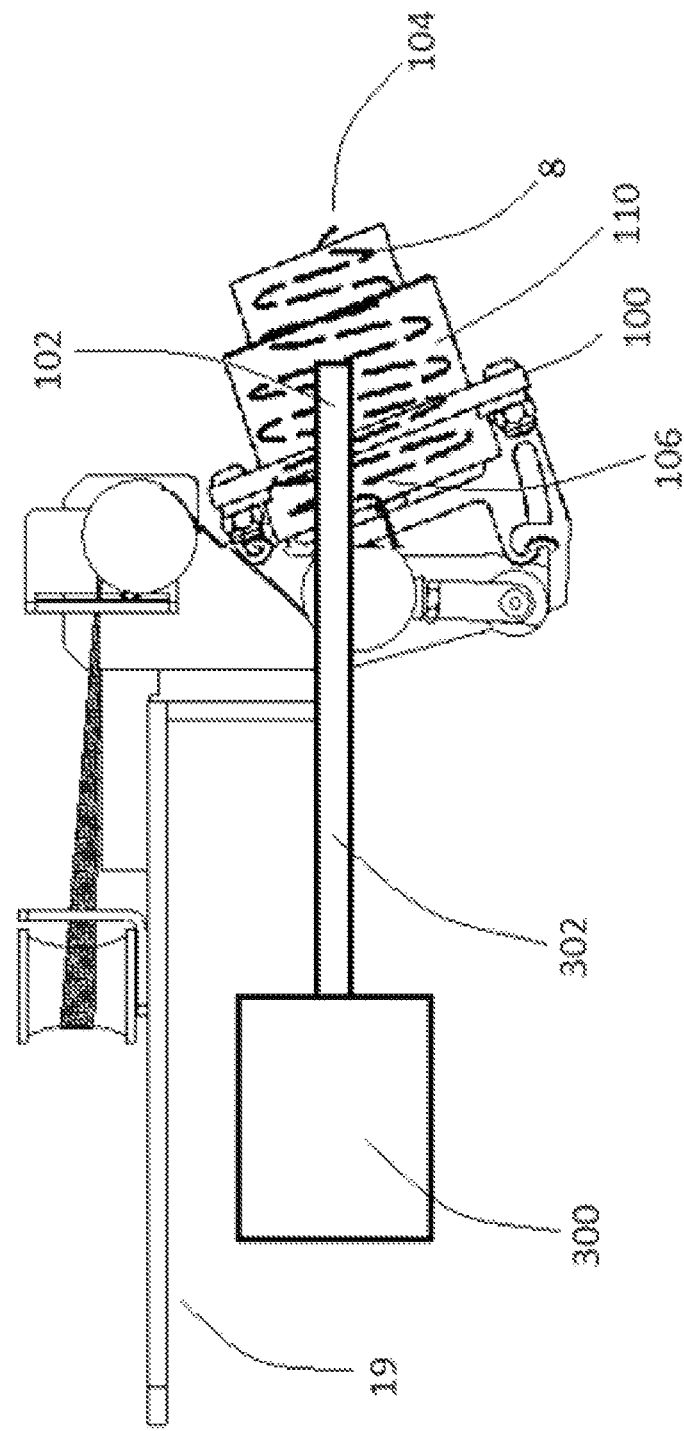
FIG. 10A shows a strip material guide arm including a gas stream generator, with a strip material threaded through the guide arm and with an end portion of the strip material bunched up within a passage of the gas stream generator.
Figure 10B:
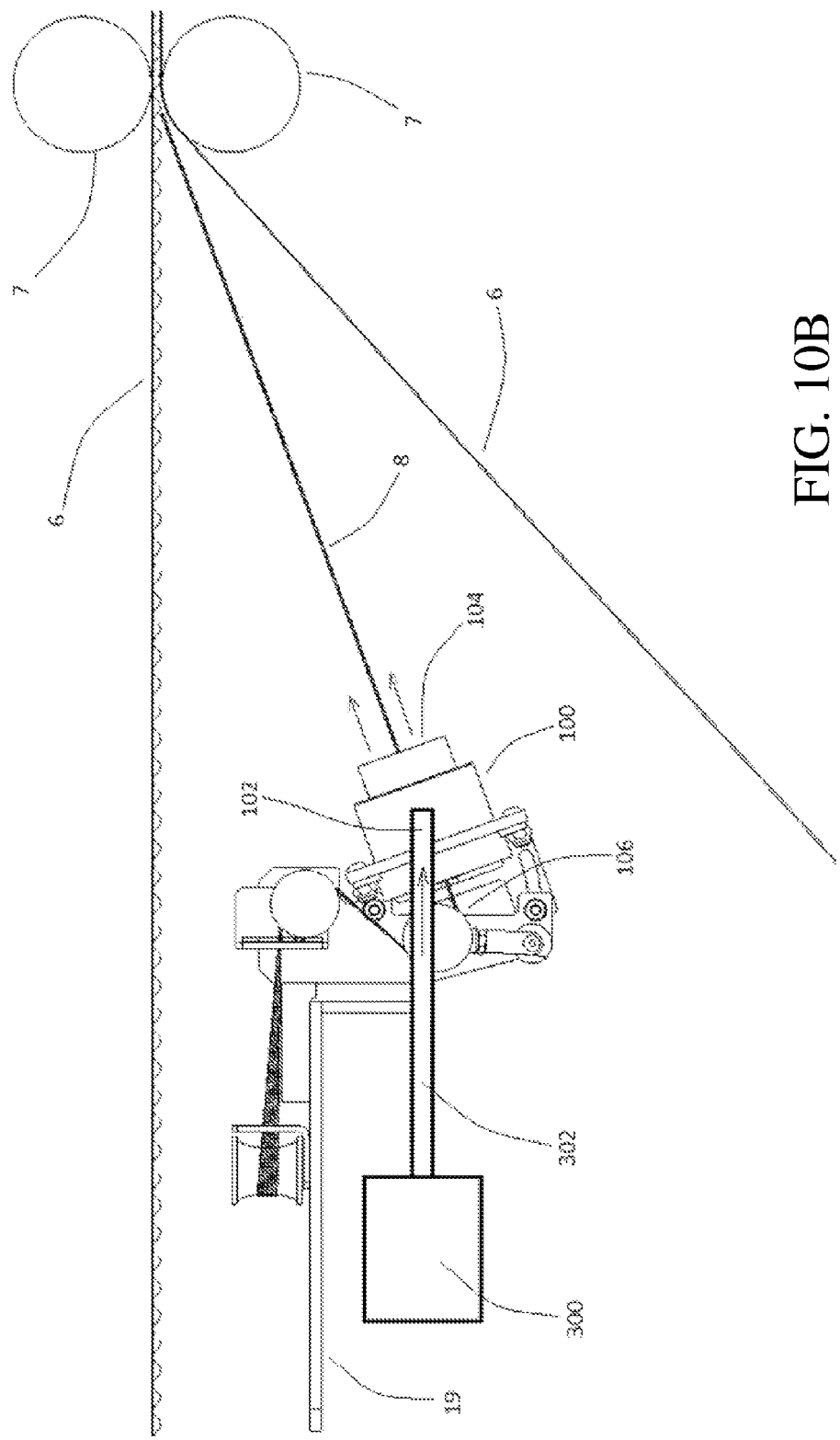
FIG. 10B shows the strip material guide arm including a gas stream generator of FIG. 10A in a substrate processing machine with the end portion of the strip material being directed out of the gas stream generator to the nip point via a gas stream.

FIG. 10A illustrates an alternative implementation of assembly 19 where the strip material 8 is threaded through inlet 106 and a leading end portion is staged (e.g., packed in) inside the chamber 110 of the gas stream generator 100, instead of hanging limp, ready to be started in the machine 4. The strip material 8 is started as illustrated in FIG. 10B when gas is introduced through gas duct 302 to inlet 102 creating gas stream flowing through inlet 106 and exiting through outlet 104 forcing the staged leading end portion of the strip material 8 out of the chamber 110 and causing the strip material 8 to be conveyed toward and into the nip point between rollers 7 and substrates 6.

Embodiments of strip material guide apparatus 200, as shown in FIGS. 2 and 3, can include plural assemblies 19, as shown in FIGS. 8-10, located along the length of each frame 16. As shown in FIG. 2, one frames 16 and its assemblies 19 can be inserted between the substrates 6 of substrate processing apparatus 4, while another frame 16 and its assemblies 19 are located above or below the substrates 6. Each assembly 19 may be connected to a separate duct 302. The high pressure gas flow of each of these ducts may be controlled separately. Alternatively, the ducts 302 can be interconnected so that the assemblies 19 may be controlled together. The assemblies 19 may move independently or together along the length of the frames 16 of the substrate dispensing apparatus 200.

The pressure and volume flow rates of the gas flows can vary in different embodiments. Some exemplary embodiments of gas stream generators 100 may rely on high pressure gas entering the intake 102 at about 5-290 pounds per square inch gauge (psig), such as about 70-100 psig, and at about 5-30 standard cubic feet per minute (SCFM), such as 14-16 SCFM. In such embodiments, about 75-350 SCFM, such as about 188-194 SCFM or about 300-350 SCFM, of gas may be exhausted through the outlet 104.

Figure 11:
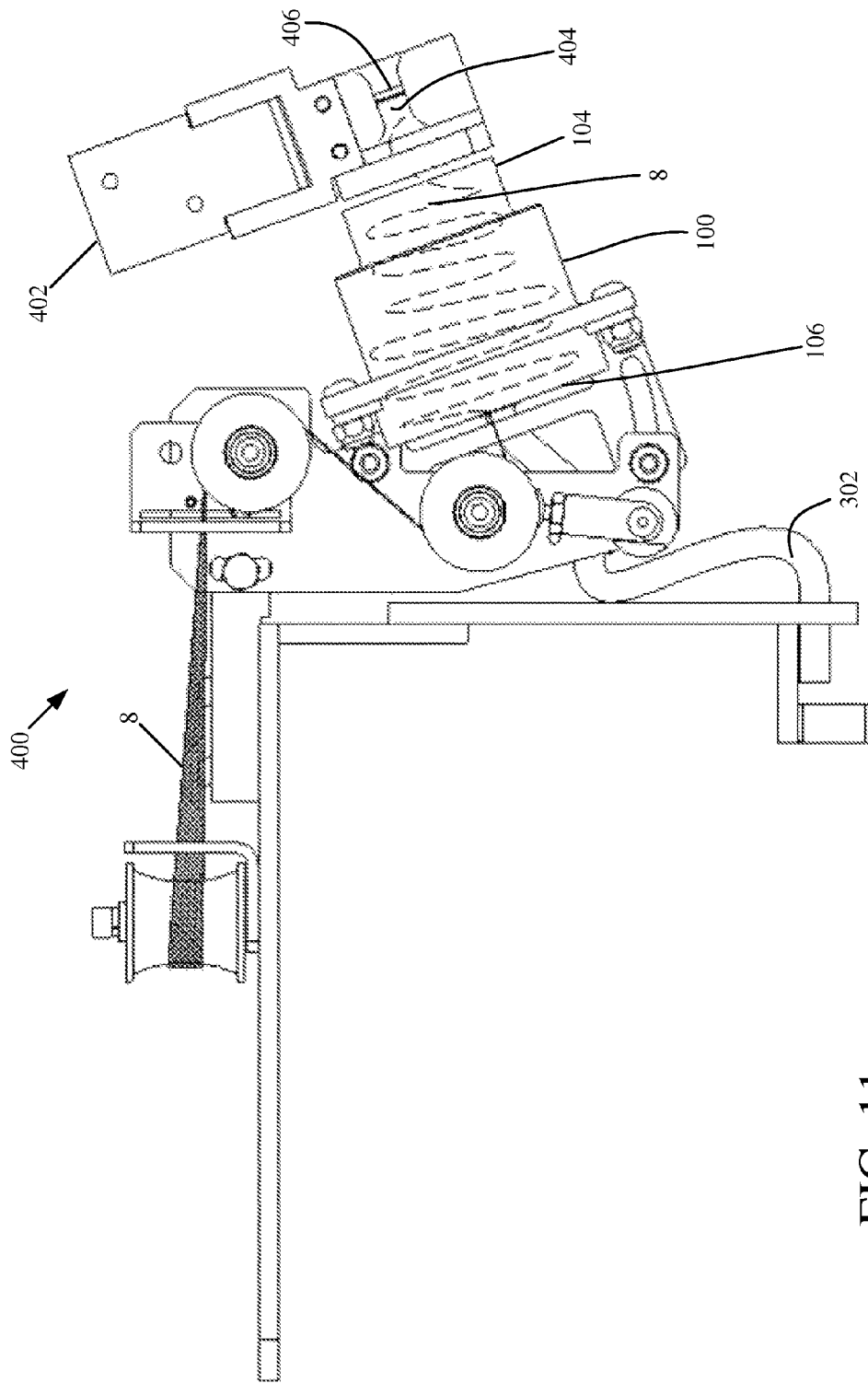
FIG. 11 is a side view of an exemplary guide arm that includes a gas stream generator and a strip pincher, with a lead end of a strip material bunched up in the gas stream generator.

FIG. 11 shows an alternative guide arm assembly 400 that is similar to the assembly 19 shown in FIG. 10A and further includes an exemplary strip pincher 402 for pinching and/or cutting the strip material 8. The strip pincher 402 is mounted in front of the outlet 104 of the gas stream generator 100. In FIG. 11, the compressed gas conduit 302 is illustrated in an exemplary configuration that extends from an intake 102 (not shown in FIG. 11) of the gas stream generator 100. The conduit 302 is configured to be coupled to a compressed gas source not shown in FIG. 11.

Figure 14:
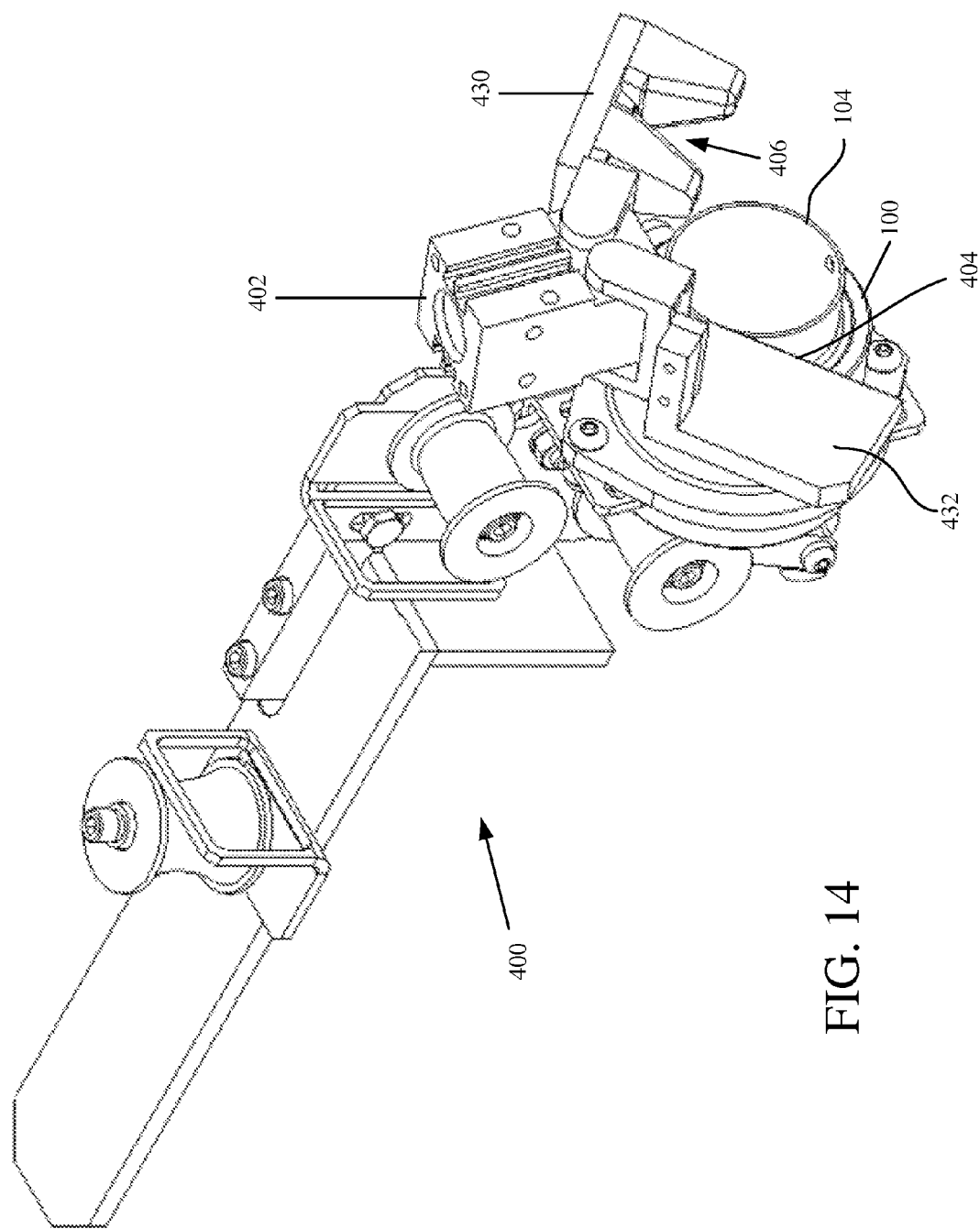
FIG. 14 shows an exemplary guide arm including a gas stream generator and a strip pincher in an open position.
Figure 15:
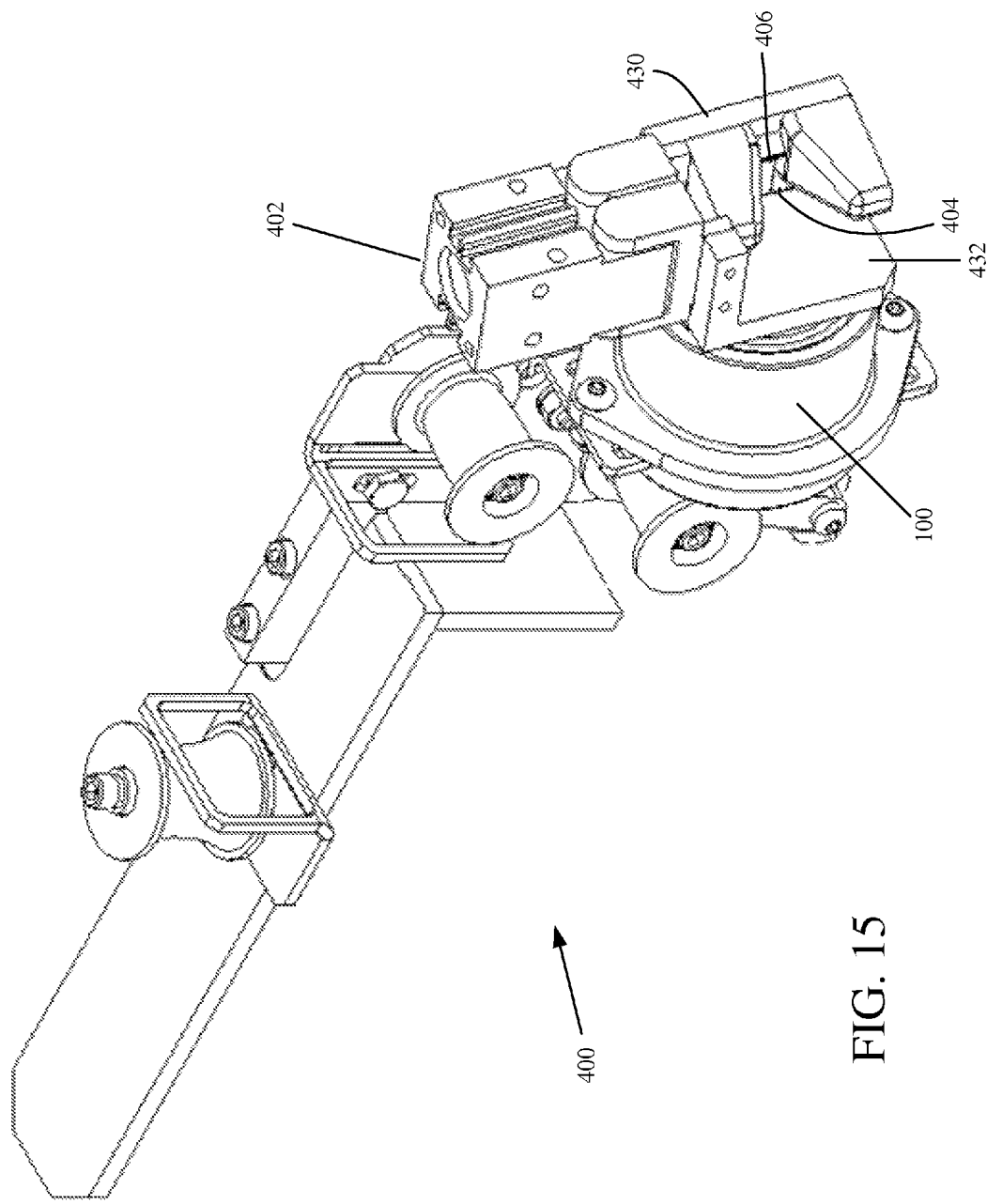
FIG. 15 shows the guide arm of FIG. 14, with the strip pincher in a closed position.

The exemplary strip pincher 402 is shown in more detail in FIGS. 14-16. In other embodiments, alternative strip pinchers and/or strip cutters can be included. In some embodiments, instead of having two arms that pivot about a base, a strip pincher can comprise a cylinder that moves up and down from the strip material to pinch/cut and release the strip material. In some embodiments, a strip pincher/cutter can function similar to a guillotine with an actuating member moving perpendicular to the strip material relative to a stationary base to pinch and/or sever the strip material. In some embodiments, the strip pincher can be powered by a solenoid or other electrical-mechanical device, and/or can be hydraulically powered, and/or can be pneumatically powered.

FIGS. 14 and 16A-16D show the exemplary strip pincher 402 in an open configuration, while FIG. 15 shows the strip pincher in a closed configuration. As shown in FIGS. 16A-16D, the strip pincher includes two arms 430, 432 that pivot on a base 434. The two arms are configured to create a pinch point 404 and a cut point 406 at their interface when the two arms pivot to the closed position. The cut point 406 is in front of the pinch point 404. The strip pincher 402 can be powered pneumatically using a compressed gas source coupled to the strip pincher via a conduit.

Figure 13:
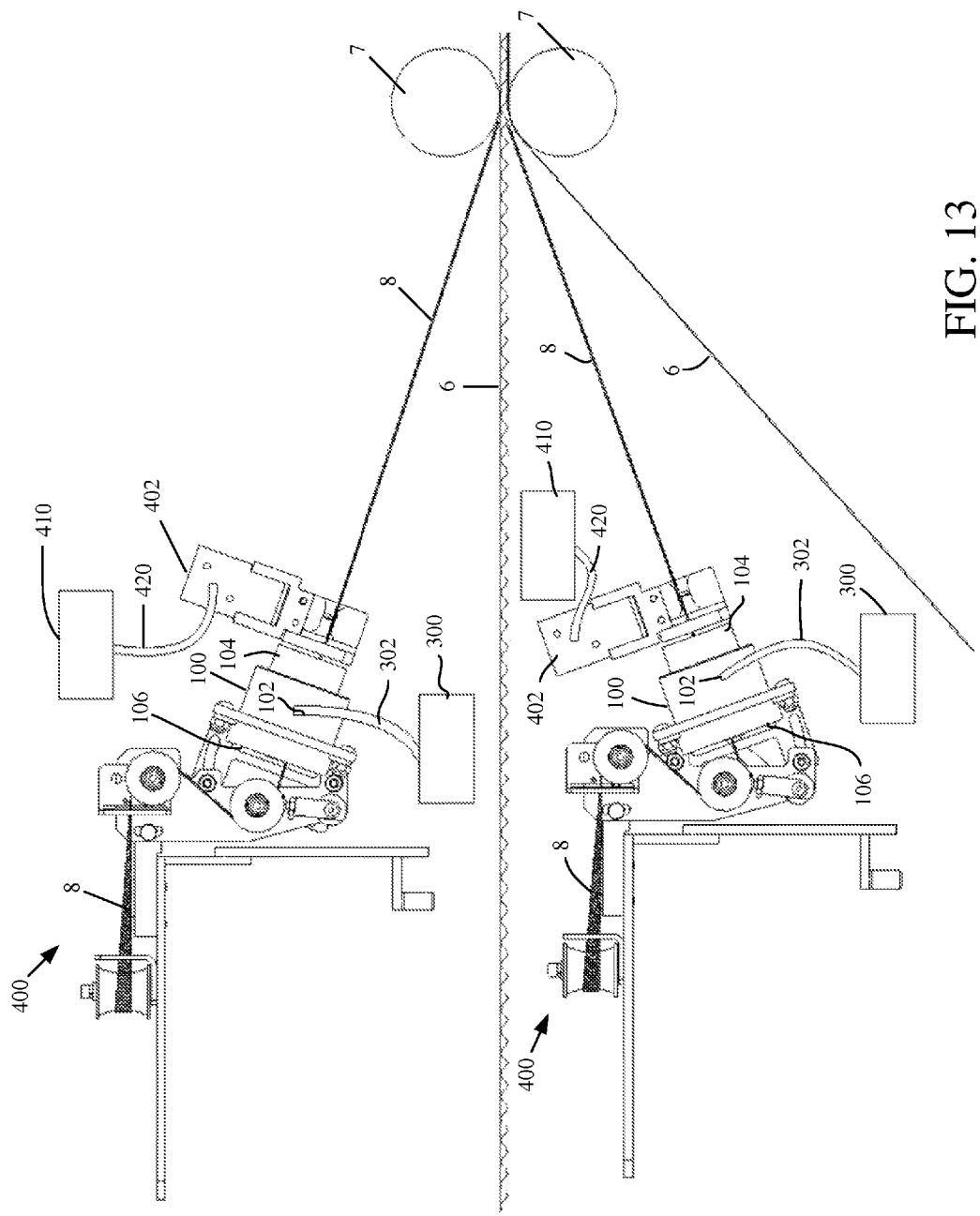
FIG. 13 is a side view of an exemplary system including two guide arm assemblies that each includes a gas stream generator and a strip pincher, with the two guide arm assemblies positioned on opposite sides of a running substrate in a substrate processing machine, and with two strip materials being fed into a nip point of the substrate processing machine.

FIG. 13 shows an exemplary system having two guide arm assemblies 400 wherein each strip pincher 402 is coupled to a compressed gas source 410 via a conduit 420. The first assembly 400 is positioned between two running substrates 6 and a second assembly 400 is positioned above the upper substrate 6. The two strip materials are directed into the nip point between rollers 7 to join with the substrates 6. The upper strip material 8 is joined to the top surface of the resultant composite substrate, while the lower strip material 8 is added between the layers of the resultant composite substrate. In other embodiments, a guide arm assembly 400 can be located below the lower substrate 6 to dispense a strip material onto the lower surface of the composite substrate.

Figure 13A:
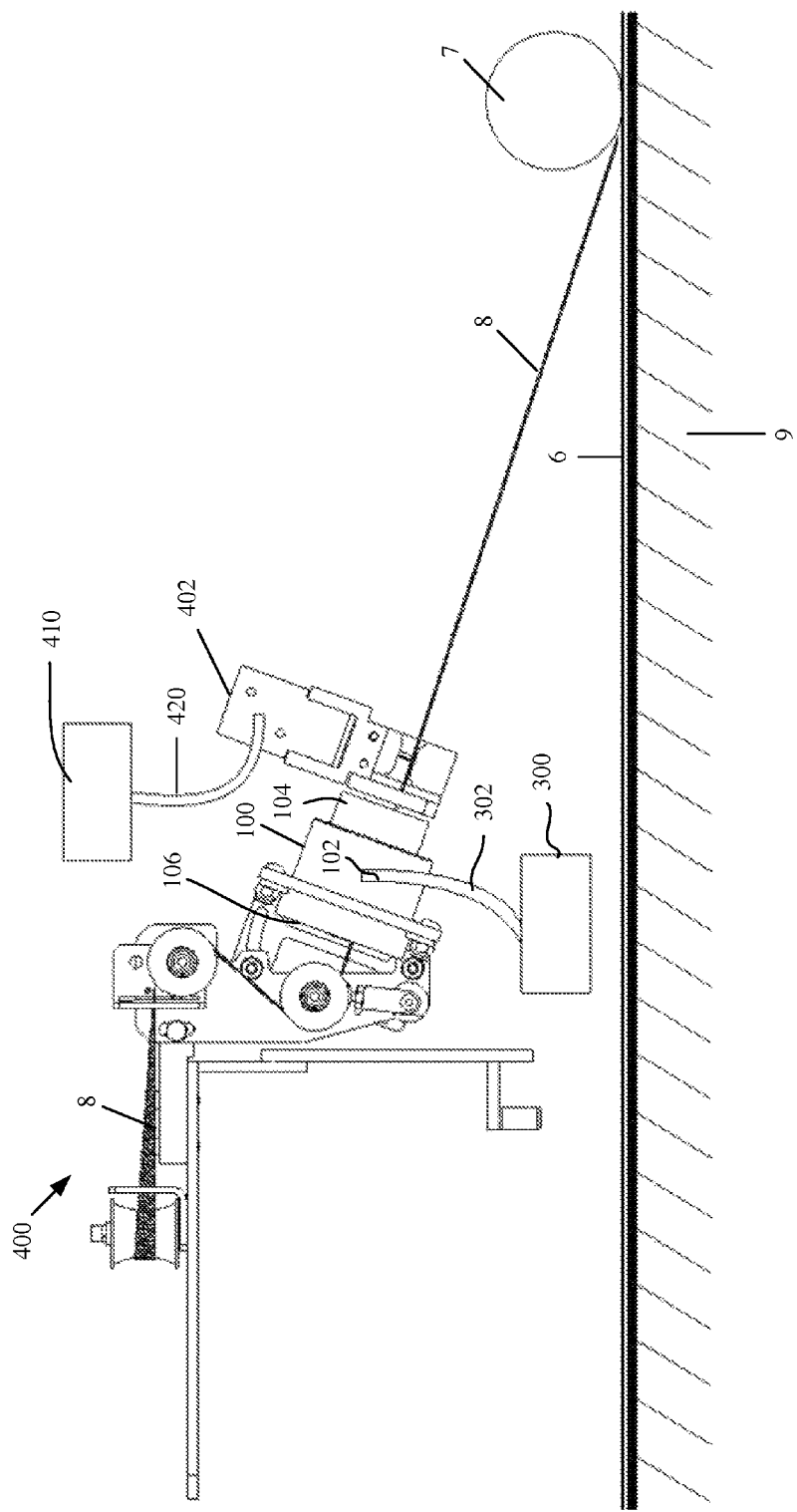
FIG. 13A is a side view of an exemplary system including a single guide arm assembly that includes a gas stream generator and a strip pincher, with the guide arm assembly positioned above a single substrate that move along a flat support surface in a substrate processing machine, and with a single strip material being fed into a nip point of the substrate processing machine to join with the single substrate.

FIG. 13A shows an exemplary system have a single guide arm assembly 400 positioned above a single running substrate 6. The substrate 6 moves along a flat support surface 9 and joins with the strip material 8 at a nip point between a roller 7 and the flat support surface 9. Such a system can be included at a dry end of a corrugator, for example.

In the implementation shown in FIG. 11, a leading end portion of a strip material 8 is loaded into the internal passageway of the gas stream generator 100 with a lead end of the strip material engaged in, or near, the pinch point 404 of the strip pincher 402. The arms 432, 430 of the strip pincher can be in the closed position or can be in the open position. In this configuration, the bunched up leading end portion of the strip material 8 is ready to be started into a substrate processing machine. To start the strip material 8, the strip pincher 402 is opened, if not in the open position already, and the gas stream generator 100 is activated to generate a gas stream to convey the leading end portion of the strip material out of the gas stream generator 100 and into a nip point of the substrate processing machine, as shown in FIG. 13.

Figure 12:
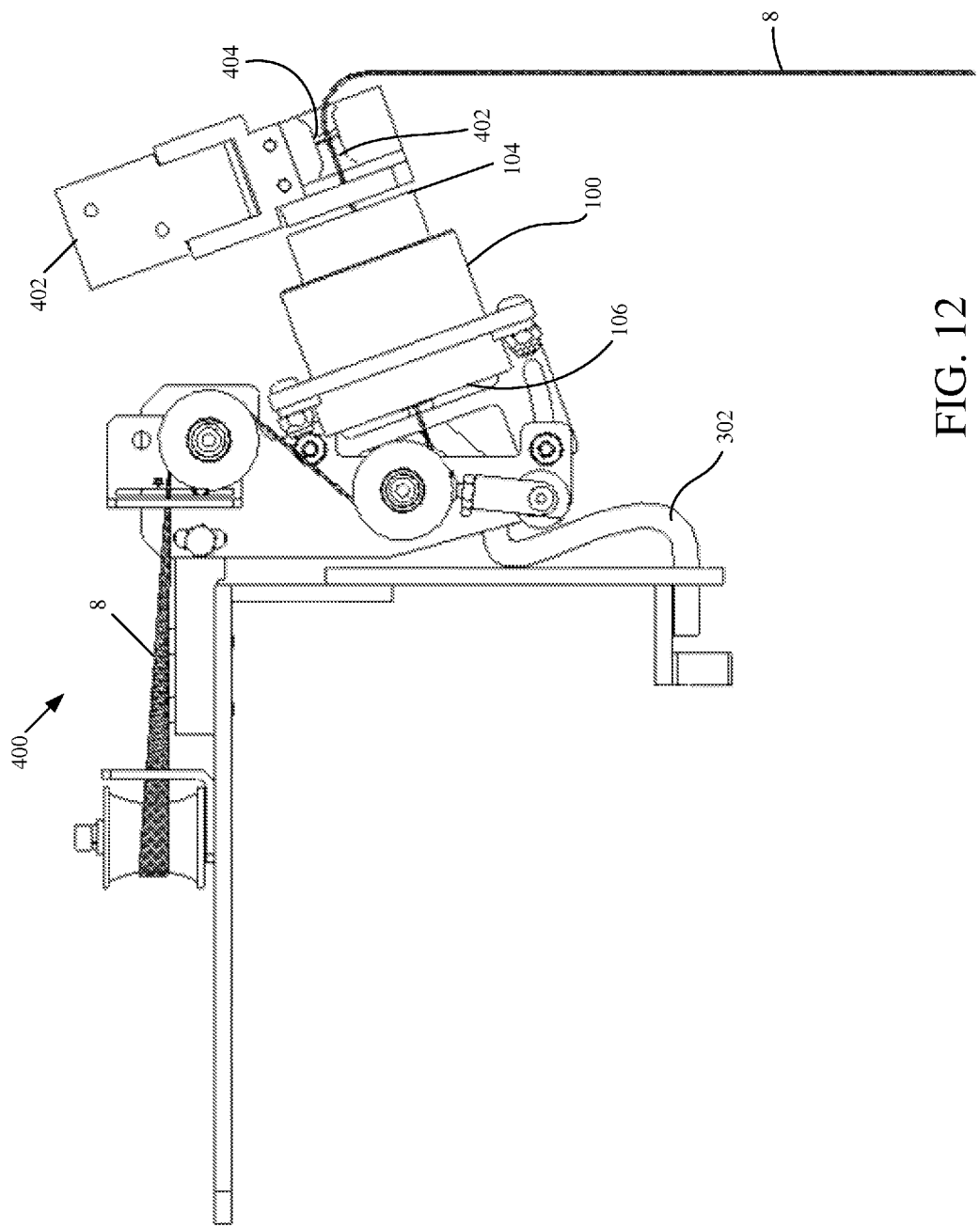
FIG. 12 is a side view of the guide arm of FIG. 11 with the lead end of a strip material hanging free from the strip pincher.

FIG. 12 shows an alternative implementation where the leading end portion of the strip material 8 hangs limp in front of the strip pincher 402 prior to starting the strip material in the machine. To start the strip material 8, the strip pincher 402 is opened, if not in the open position already, and the gas stream generator 100 is activated to generate a gas stream to convey the limp hanging leading end portion of the strip material into a nip point of the machine.

After a run of the strip material 8 is complete, the strip pincher 402 can be closed to cut the strip material into two segments at the cutting point 404, with the leading segment being pulled into the machine. The strip pincher 402 can also pinch the leading end of the trailing segment of the strip material 8 at the pinch point 402. Slack can then be added to the trailing segment of the strip material 8 so that it can be placed into either of the configurations shown in FIGS. 11 and 12 to be ready to be started for another run.

As shown in FIGS. 16A-16D, the cut point 406 can comprise a sharp blade and/or serrated edge on the arm 430 that is oriented transverse to the strip material. As the arms 430, 432 close together, cut point 406 contacts the taught strip material that is being pulled into the nip point of the machine and severs the strip material. The pinch point 404 can include a first surface on the arm 432 and an opposing second surface on the arm 430 behind the cut point, such that the two surfaces clamp together to grip the strip material just behind the location where the strip material is cut.

The two compressed gas sources 300 for the two illustrated gas stream generators can be a common source or separate sources. Likewise, the two compressed gas sources 410 for the two illustrated strip pinchers 402 can be a common source or separate sources. In some embodiments, all of the compressed gas sources 300 and 410 can be a common source. Individual conduits 302 and 420 can be provided for each device 100 and 402.

Figure 23:
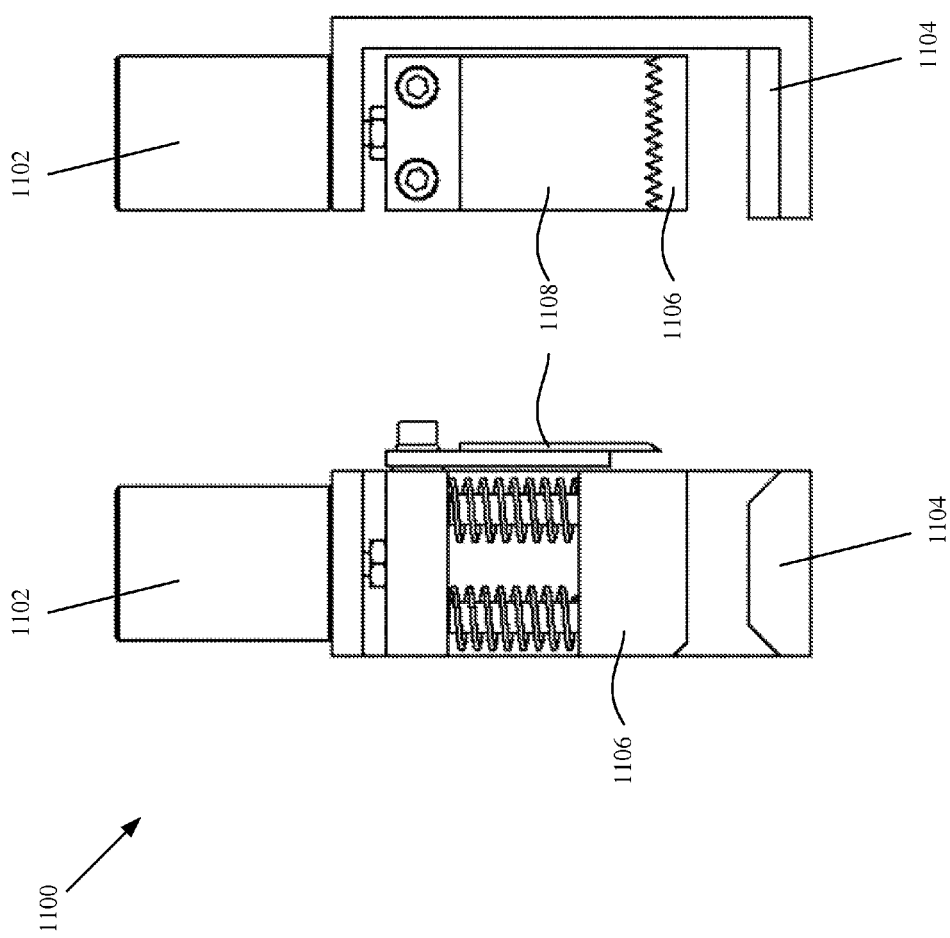
FIG. 23 shows two orthogonal views of another exemplary device for pinching and cutting strip materials.

FIG. 23 shows two orthogonal views of another exemplary strip pincher 1100. The strip pincher 1100 comprises a base 1102, a rigid arm 1104, a piston 1106, and a cutter 1108. The strip pincher is shown in an open configuration in FIG. 24. The base 1102 can cause the piston 1106 to move down against the rigid arm 1104 to pinch a strip material therebetween, and can cause the piston to move up away from the rigid arm to release the strip material. When the piston 1106 moves down to pinch a strip material, the cutter 1108, which is attached to the piston, also moves down against the strip material to cut the strip material. The strip pincher 1100 can include a pneumatic actuator, a solenoid, or other mechanism to drive the piston 1106 between the open and closed positions.

Figure 24:
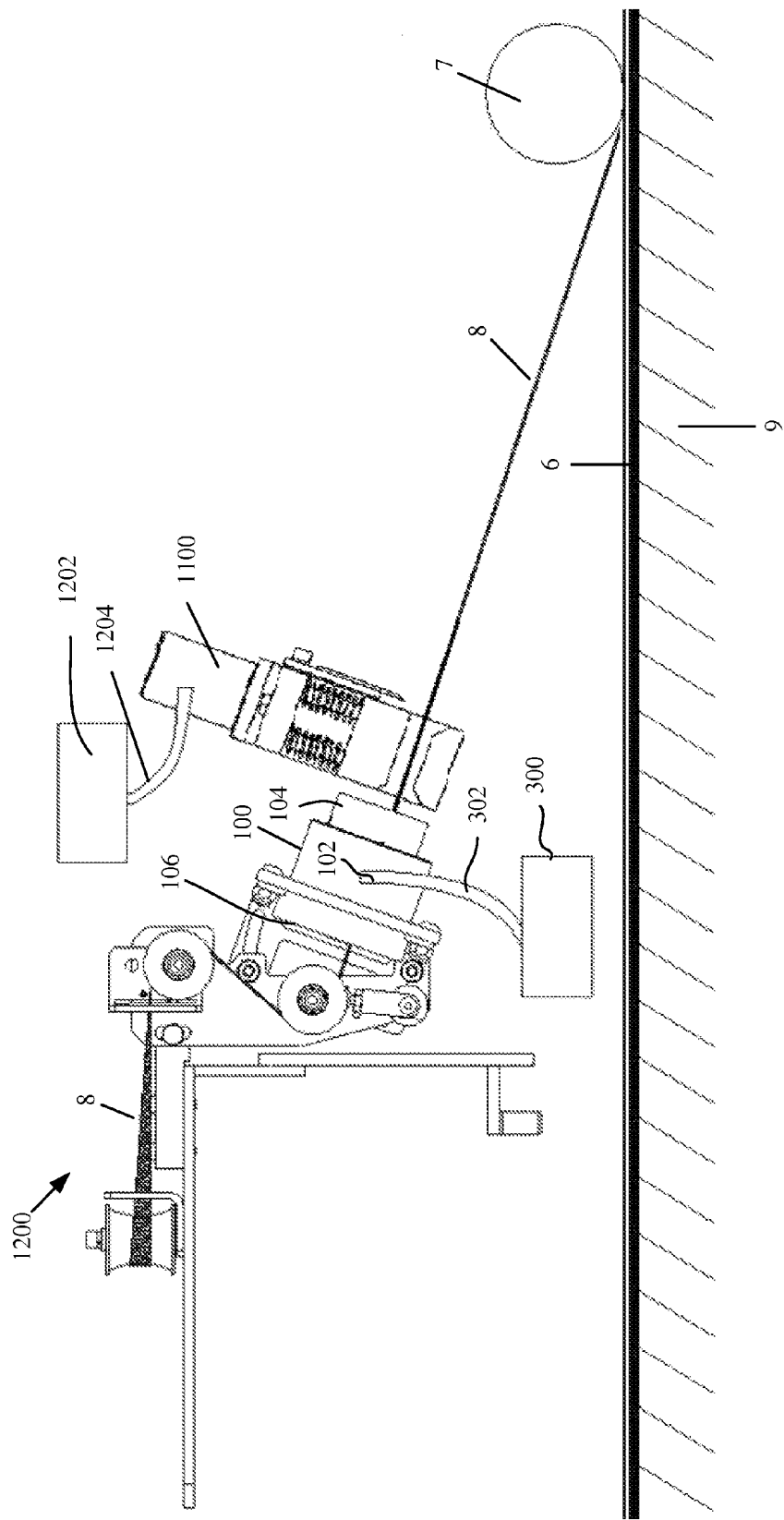
FIG. 24 is a side view of an exemplary system including a single guide arm assembly that includes a gas stream generator and the strip pincher of FIG. 23, with the guide arm assembly positioned above a single substrate that move along a flat support surface in a substrate processing machine, and with a single strip material being fed into a nip point of the substrate processing machine to join with the single substrate.

FIG. 24 shows an exemplary guide arm assembly 1200 that include a gas stream generator 100 along with a strip pincher 1100. The strip pincher 1100 is coupled to a gas source 1202 via a conduit 1204. Similar to FIG. 13A, FIG. 25 illustrates a single guide arm assembly 1200 positioned above a single running substrate 6. The substrate 6 moves along a flat support surface 9 and joins with the strip material 8 at a nip point between a roller 7 and the flat support surface 9. The strip pincher 1100 can also be used in various other systems as disclosed herein.

Figure 17:
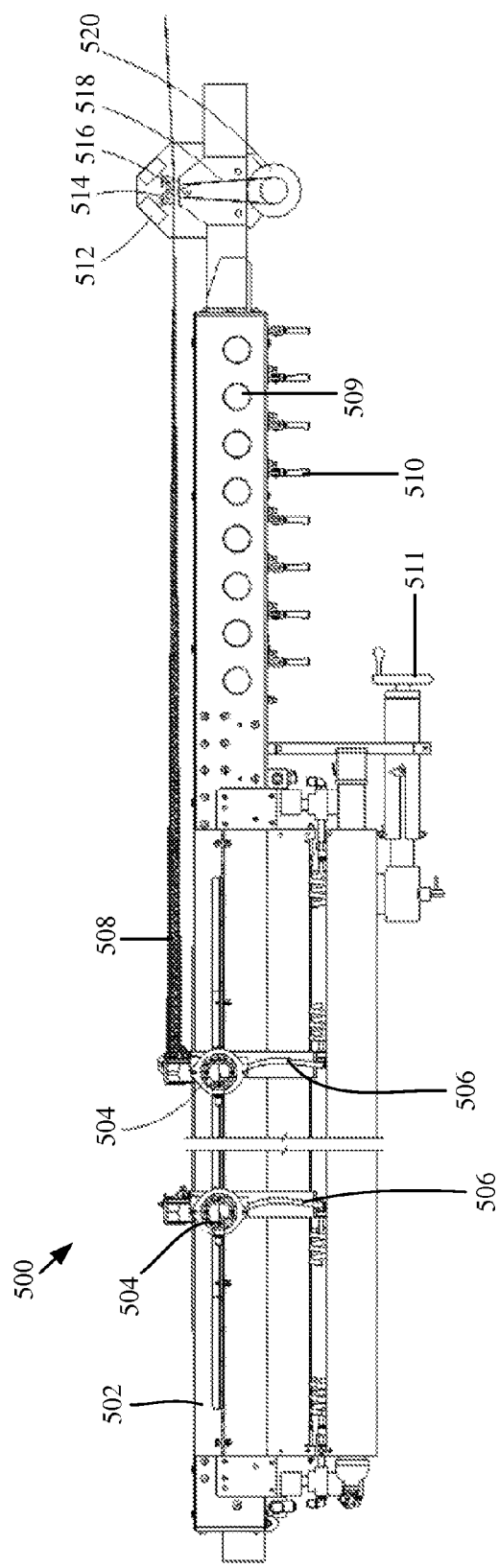
FIG. 17 is a front view of a portion of an exemplary strip material guide system including plural adjustable guide arms, each including a gas stream generator, and a mechanism for advancing strip material toward the guide arms to provide slack.

FIG. 17 is a side view of a portion of an exemplary strip material guide apparatus 500 that includes a frame 502 that extends transversely of the direction of a running substrate (not shown) and supports any number of guide arm assemblies 504 for starting and guiding strip materials 508 into a substrate processing machine. Each guide arm assembly 504 can comprise rollers for guiding the strip material and a gas stream generator for starting the strip material. The guide arm assemblies 504 can include strip pinchers (like the assembly 400 shown in FIGS. 11-14) or may not include strip pinchers (like the assembly 19 shown in FIGS. 8-10). The gas stream generators and/or strip pinchers of the assemblies 504 can be coupled to compressed gas sources via conduits 506. The guide arm assemblies 504 can be individually movable along a length of the frame 502 using controls 509 and can be held in a selected transverse location relative to the frame using brake levers 510. The entire frame 502 can also be moved transversely relative to the moving substrate using control 511, thereby adjusting the positioning of all of the assemblies 505 in unison. The frame 502 and the assemblies 504 can be manually adjustable and/or can be controlled by an automated control system that adjusts the positioning based on user input and/or based on position sensor feedback.

The strip material guide apparatus 500 can also include a strip material feed mechanism shown at the right of FIG. 17 to feed the strip material toward the assemblies 504. The strip material passes between a drive roller 516 and one or more idler rollers 514 (two of which are shown). The idler rollers 514 can be actuated by actuators 512 to urge the idler rollers against the drive roller 516 or to retract the idler rollers away. The drive roller 516 can be driven via a suitable power transmission device 518 coupled to a motor 520, such as a belt, chain and sprockets, gears, etc, When the idler rollers 514 are urged against the drive roller 516, the drive roller can actively turn to advance the strip material to generate slack in the strip material. Such slack can be created in the leading end portion of the strip material to provide enough extra length so that it can be started into a substrate processing machine using the gas stream generators, such as via any of the methods disclosed herein.

Figure 18:
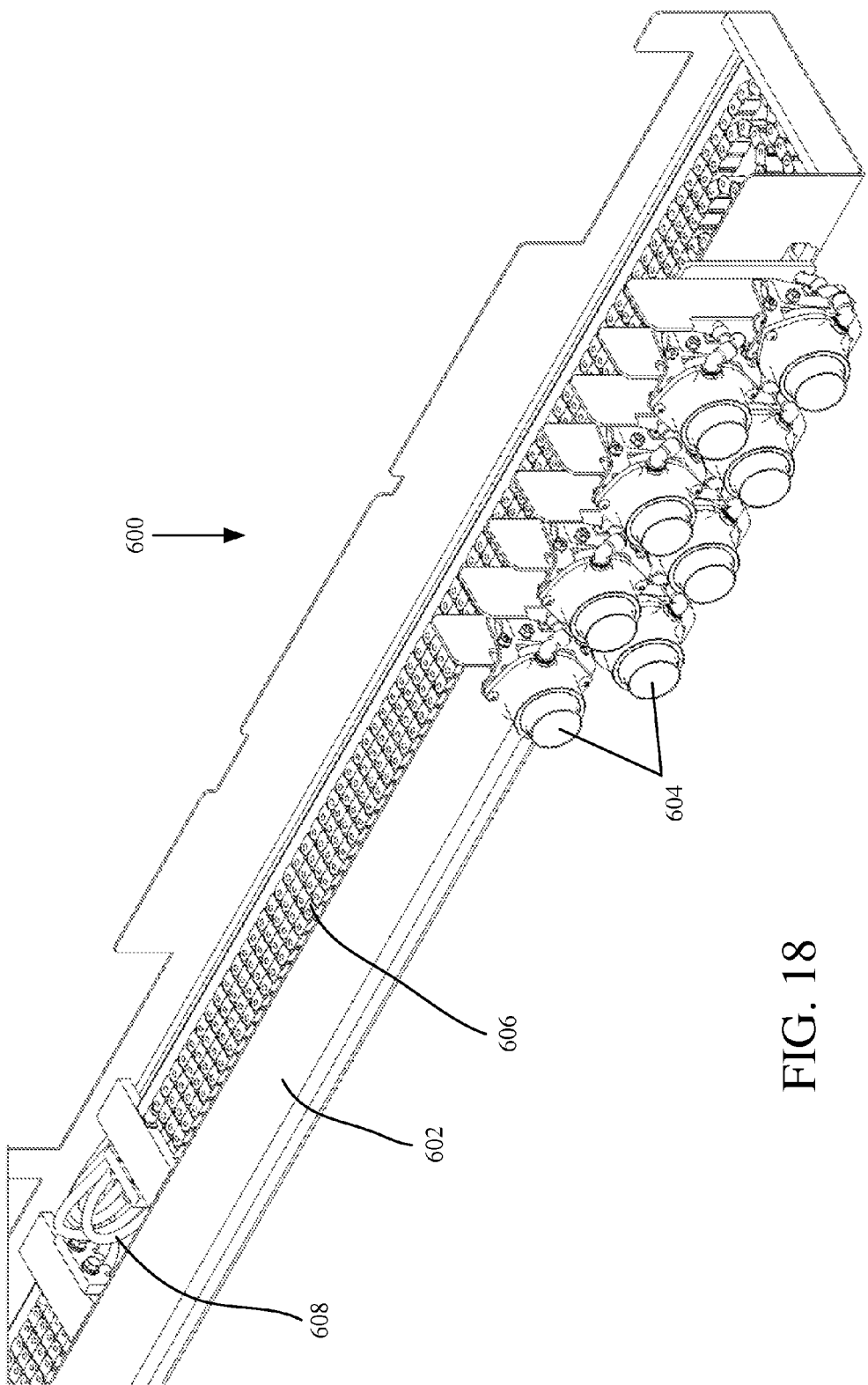
FIG. 18 is a perspective view of a portion of an exemplary strip material guide system including plural adjustable guide arms each including a gas stream generator and a flexible guide for organizing gas conduits coupled to the gas stream generators.

FIG. 18 is a perspective view of another exemplary strip material guide apparatus 600 that includes a frame 602 that extends transversely of the direction of a running substrate (not shown) and supports any number of guide arm assemblies 604 for starting and guiding strip materials into a substrate processing machine. Each guide arm assembly 604 can comprise a gas stream generator for starting the strip material. The guide arm assemblies 604 can also include strip pinchers (like the assembly 400 shown in FIGS. 11-14) or may not include strip pinchers (like the assembly 19 shown in FIGS. 8-10). The gas stream generators and/or strip pinchers of the assemblies 604 can be coupled to compressed gas sources via flexible conduits 608 that extend through flexible guides 606 that are supported within the frame 602. The guides 606 can comprise chains, belts, or similar devices, and can include an internal passageway for routing and protecting the gas conduits 608. The guide arm assemblies 604 can be individually movable along a length of the frame 602, and as they move the associated gas conduits 608 and guides 606 can bend and articulate in an organized manner to keeps the conduits from kinking or getting tangled with one another.

Figure 19:
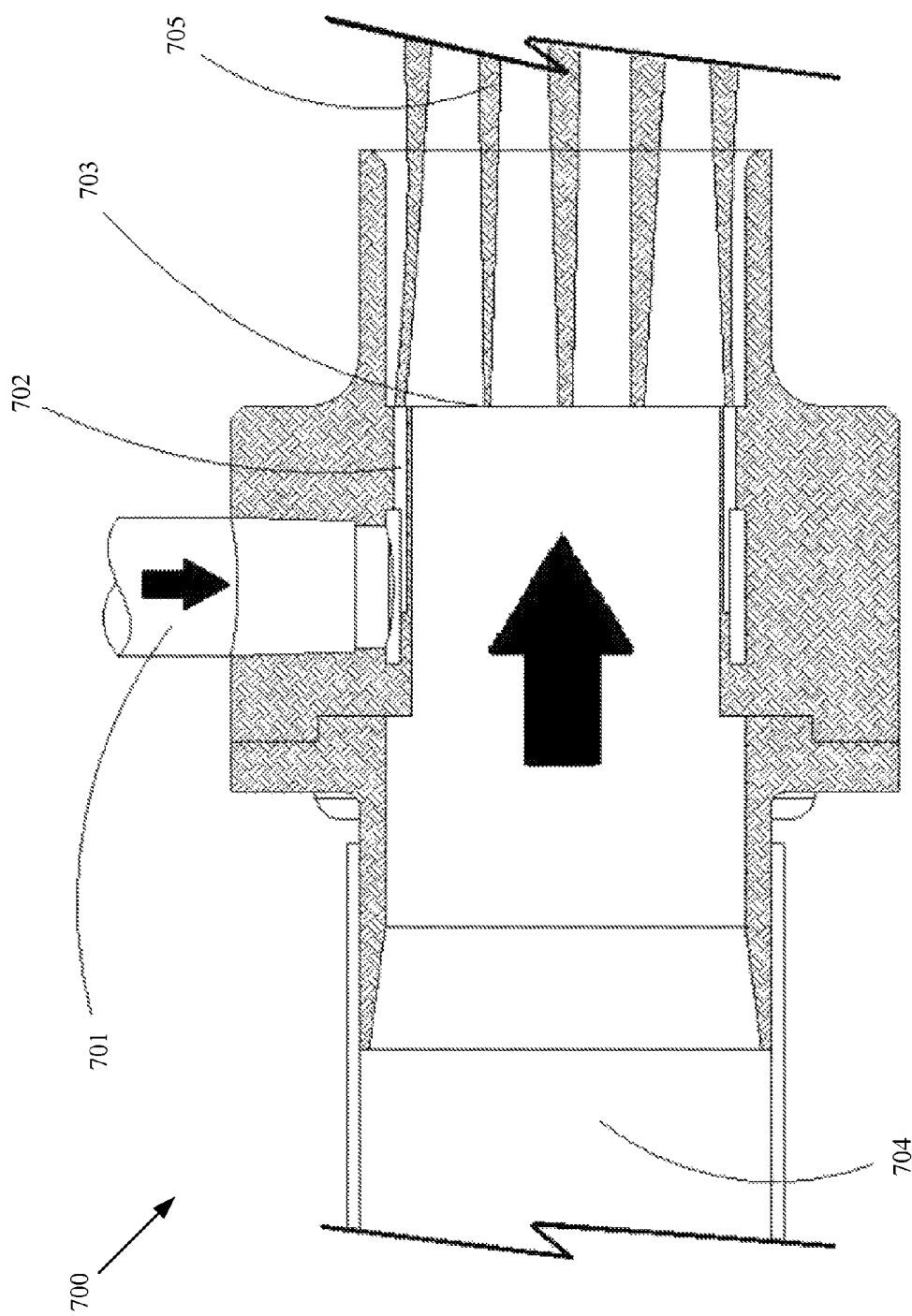
FIG. 19 is a side cross-sectional view of an exemplary gas stream generator including a plurality of internal gas nozzles located within a passage through which a generated gas stream flows.

FIGS. 19-22 illustrate alternative gas stream generators that can be used in place of or in addition to the gas stream generators 100 described herein. FIG. 19 shows a gas stream generator 700 that includes a gas intake 701 that feeds compressed gas into an annular plenum chamber 702. The compressed gas is then injected into the throat through directed nozzles 703 spaced around the perimeter of the throat. These jets of gas create a vacuum at the inlet 704 which draws ambient air in and accelerates it through the throat and out through the outlet 705 to create a stream of gas for conveying strip material similar to the functionality of the embodiments 100 described herein.

Figure 20:
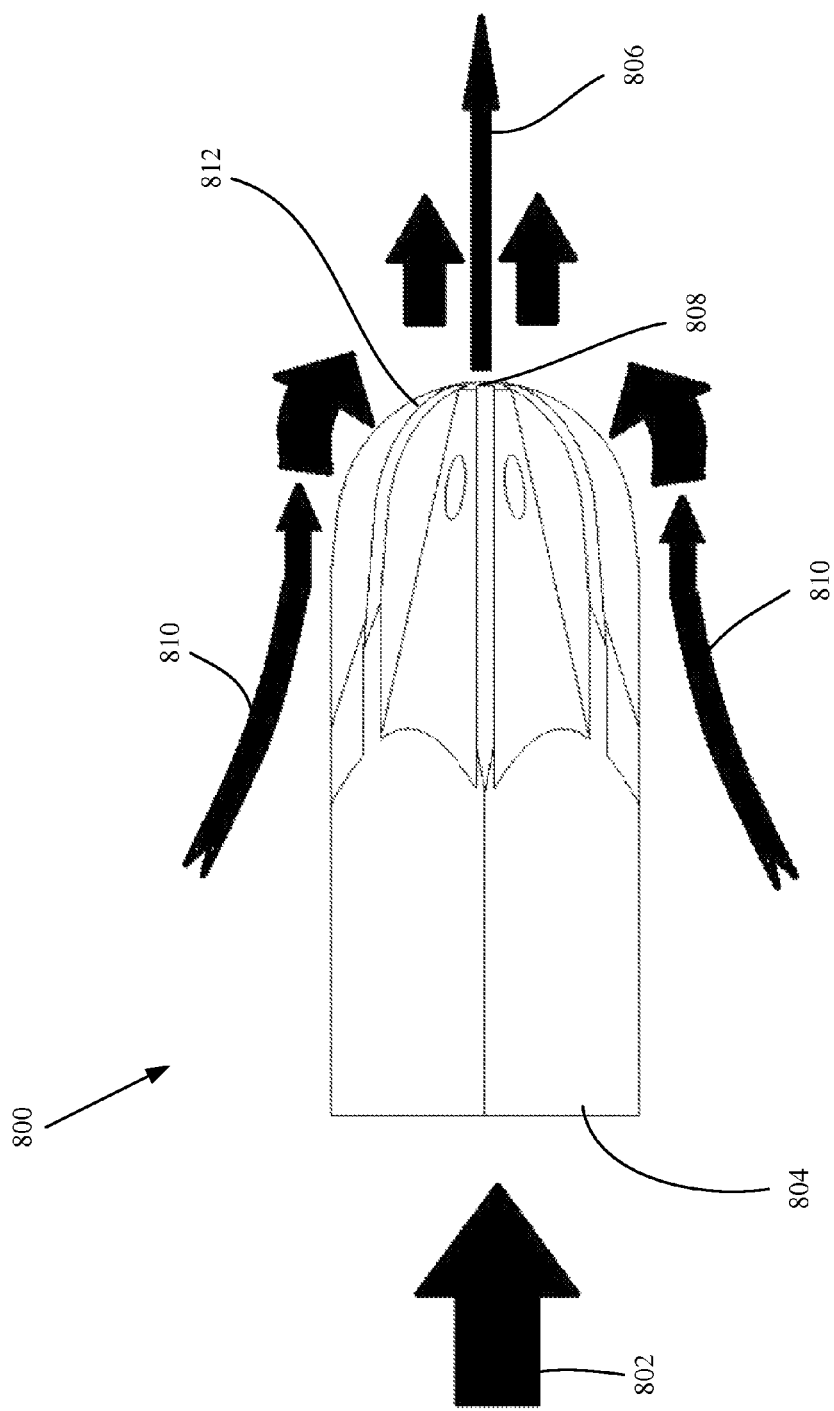
FIG. 20 is a side view of an exemplary gas nozzle that utilizes the Coanda effect to generate a gas stream.

FIG. 20 is a side cross-sectional view of another exemplary gas stream generator 800. Compressed gas 802 is forced into inlet 804 and exits as a high velocity jet 806 through one or more nozzles 808. The low pressure jet 806 causes ambient are 810 to flow along the outer surfaces 812 of the device and become entrained with the jet flow, resulting in a large volume flow (e.g., 25 times or more the volume of the inlet flow 802), which attracts adjacent strip material into the flow via the Coanda effect and conveys the strip material along with the flow. The gas stream generator 800 can be positioned alongside a strip material, rather than having the strip material passing through the gas stream generator.

Figure 21:
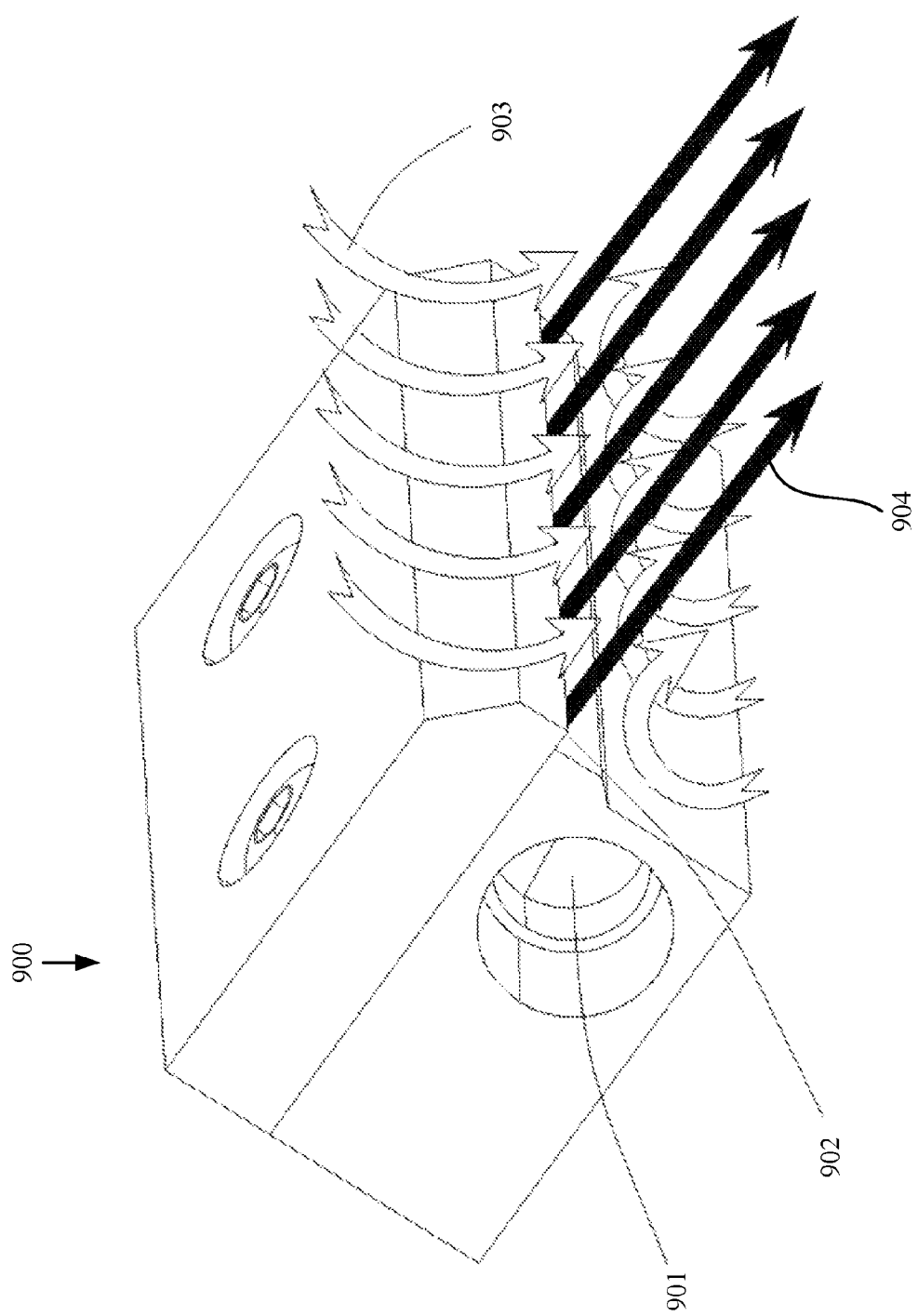
FIG. 21 shows an exemplary gas knife that generates a sheet of laminar gas flow.

FIG. 21 shows an exemplary gas stream generator 900 that creates a sheet-like laminar gas stream. The generator 900 includes a compressed gas intake 901 and a narrow slit 902 where the compressed gas outlets as a laminar jet 904. The laminar jet 904 causes ambient air 903 to become entrained from the top and bottom to create a high volume sheet of flowing gas that can attract adjacent strip material into the flow and can convey the strip material along with the flow. The gas stream generator 900 can be positioned alongside a strip material, rather than having the strip material passing through the gas stream generator 900.

Figure 22:
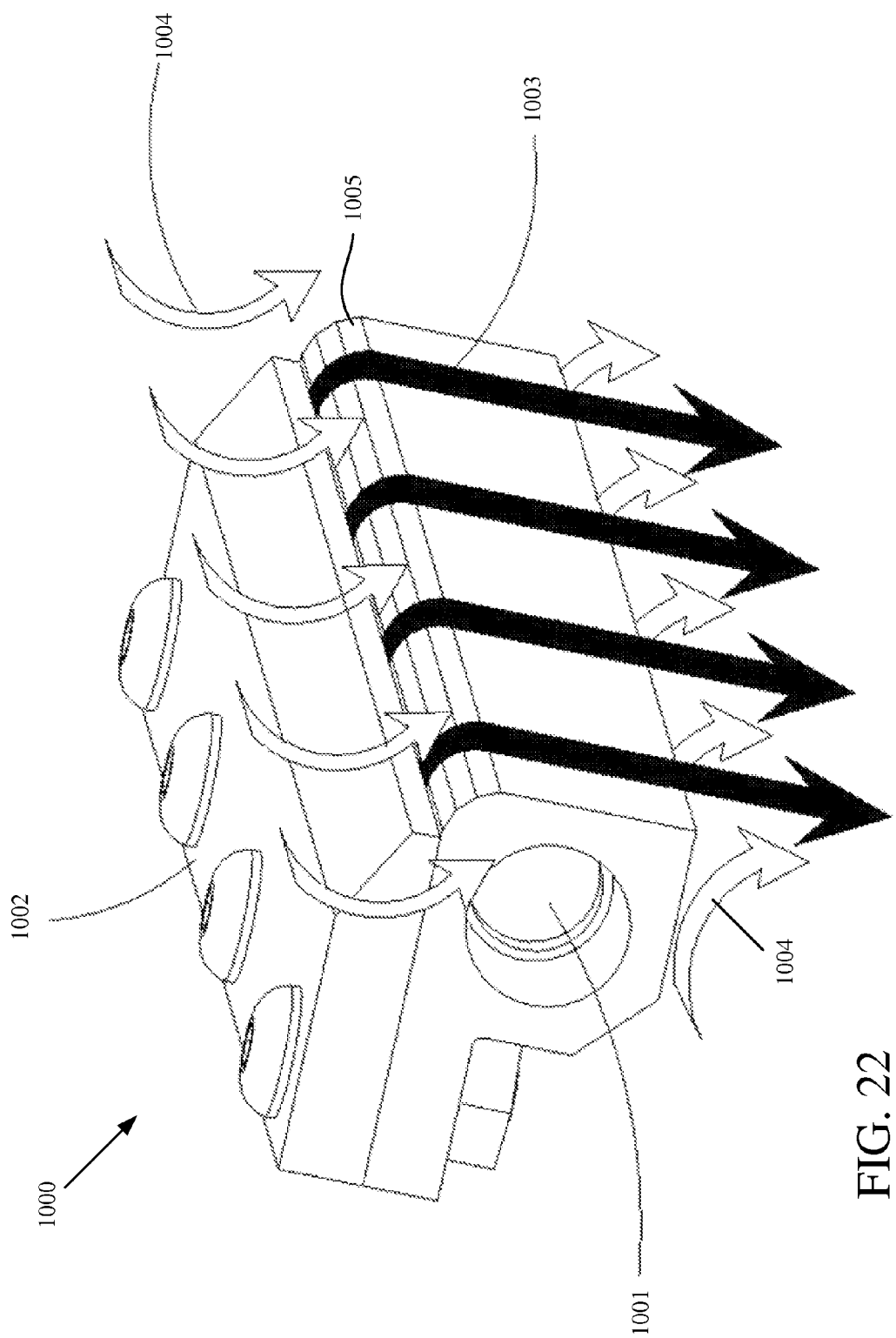
FIG. 22 shows another exemplary gas knife that generates a sheet of laminar gas flow.

FIG. 22 shows another exemplary gas stream generator 1000 that creates a sheet-like laminar gas stream. The generator 1000 includes a compressed gas intake 1001 that causes high velocity gas to outlet between an upper wall 1002 and a curved lower wall 1005 as a laminar jet 1003 that curves along and follows the surface of the wall 1005 due to the Coanda effect. The laminar jet 1003 causes ambient air 1004 to become entrained to create a high volume sheet of flowing gas that can attract adjacent strip material into the flow and can convey the strip material along with the flow. The gas stream generator 1000 can also be positioned alongside a strip material, rather than having the strip material passing through the gas stream generator.

Some exemplar guide arm assemblies can include a strip pincher, such as the strip pincher 402 or the strip pincher 1100, without a gas stream generator. In such embodiments, the strip pincher can be coupled to a guide arm such that a strip material passes through the guide arm and then passes through the strip pincher. The strip pincher can hold a leading end of the strip material prior to starting the strip material in a substrate processing machine, and the strip pincher can close to cut the strip material at the end of a run, thereby forming a new leading end of the strip material that is held by the strip pincher.

The foregoing apparatus and method descriptions are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods.

Any reference to claim elements in the singular, for example, using the articles "a," "an" or "the" is not to be construed as limiting the element to the singular. The term "coupled" means physically linked and does not exclude the presence of intermediate elements between the coupled or associated items absent specific contrary language.

In view of the many possible embodiments to which the principles disclosed herein may be applied, it should be recognized that the illustrated embodiments are only preferred examples and should not be taken as limiting the scope of the disclosed technology. Rather, the scope of the disclosed technology is at least as broad as the following claims. We therefore claim all that comes within the scope of these claims.

The invention claimed is:

1. A system for starting strip material in a substrate processing machine that includes a first running substrate, a running second substrate, and a nip point where the first and second running substrates join together, the system comprising:
a strip material guide apparatus configured to direct strip material from a strip material source into the nip point to join the strip material with the first and second running substrates, the strip material guide apparatus including at least one guide arm operable to set a transverse position of dispensed strip material relative to the running substrates; and
a gas stream generator coupled to the guide arm adjacent to a strip material outlet of guide arm, the gas stream generator operable to generate a stream of gas flowing in a general direction of the first running substrate, the second running substrate, or the nip point;
wherein the gas stream generator is operable to cause a leading end of a strip material dispensed from the guide arm to be conveyed via the stream of gas toward the first running substrate, the second running substrate, or the nip point, such that the leading end of the strip material becomes engaged by the substrate processing machine at the nip point and the strip material joins with the first and second running substrates;
wherein the system further comprises a strip pincher coupled to the guide arm configured to grip and cut the strip material.

2. The system of claim 1, wherein the gas stream generator comprises a passage through which the strip material passes.

3. The system of claim 1, wherein the strip material does not pass through the gas stream generator.

4. The system of claim 1, wherein the gas stream generator comprises a gas source operable to expel pressurized gas through at least one opening located within a passage of the gas stream generator, and the expelled pressurized gas induces the gas stream to flow into the passage through an inlet of the gas stream generator and out through an outlet of the gas stream generator.

5. The system of claim 1, wherein the strip pincher is positioned in front of the gas stream generator such that the strip material passes through or by the strip pincher after passing through or by the gas stream generator.

6. The system of claim 1, wherein the strip pincher is actuatable between a closed position and an open position, wherein in the closed position the strip pincher is configured to cut the strip material and clamp onto a leading end of the strip material formed behind the cut.

7. The system of claim 1, wherein the guide arm is adjustable along a frame transversely to the direction of the running substrates to change the transverse position of the dispensed strip material relative to the running substrates.

8. The system of claim 1, wherein the gas stream generator causes the leading end of the strip material to become entrained within the gas stream via a Coanda effect or impulse principle.

9. The system of claim 1, wherein the strip material guide apparatus comprises a first strip material guide apparatus including at least a first guide arm and at least a first gas stream generator coupled to the first guide arm, and the system comprises a second strip material guide apparatus including at least a second guide arm and at least a second gas stream generator coupled to the second guide arm, wherein the first and second strip material guide apparatuses are positioned on opposite sides of the first running substrate.

10. A strip material guide arm configured to guide strip material from a strip material source into a nip point of a substrate processing machine to join the strip material with a running substrate, the guide arm comprising:
a gas stream generator operable to generate a stream of gas flowing generally toward the running substrate or the nip point; and
a strip pincher configured to grip and cut the strip material;
wherein the strip pincher is operable to cut the strip material to create a tail end of a first portion of the strip material that is engaged by the substrate processing machine and a leading end of a second portion of the strip material that is engaged by the guide arm, the strip pincher further configured to grip a leading end of the second portion of the strip material prior to starting the second portion of the strip material into the substrate processing machine; and wherein the gas stream generator is operable to cause the leading end of the second portion of the strip material, after being released by the strip pincher, to be conveyed via a stream of gas toward the running substrate or the nip point, such that the leading end of the second portion of the strip material becomes engaged by the substrate processing machine at the nip point and the strip material joins with the running substrate.

11. The strip material guide arm of claim 10, wherein gas stream generator comprises a passage and wherein the strip material and the gas stream move through the passage toward the running substrate or the nip point.

* * * * *